United States Patent [19]
Martin et al.

[11] Patent Number: 5,687,541
[45] Date of Patent: Nov. 18, 1997

[54] AUTOMATED APPARATUS AND METHOD FOR PREPARING CONTACT LENSES FOR INSPECTION AND PACKAGING

[75] Inventors: Wallace Anthony Martin, Orange Park; Russell James Edwards, Jacksonville, both of Fla.; Borge Peter Gundersen, Tikob, Denmark; Darren Scott Keene, Jacksonville, Fla.; Ture Kindt-Larsen, Holte, Denmark; John Mark Lepper, Jacksonville, Fla.; Niels Jørgen Madsen, Allerød; Thomas Christian Ravn, Helsignor, both of Denmark; Daniel Tsu-Fang Wang, Jacksonville; William Edward Holley, Ponte Vedra Beach, both of Fla.

[73] Assignee: Johnson & Johnson Vision Products, Inc., Jacksonville, Fla.

[21] Appl. No.: 461,826

[22] Filed: Jun. 5, 1995

Related U.S. Application Data

[62] Division of Ser. No. 258,557, Jun. 10, 1994, Pat. No. 5,578,331.

[51] Int. Cl.[6] .......................... B65B 57/10; B65B 55/22; C08J 7/00
[52] U.S. Cl. .......................... 53/54; 53/251; 53/495; 53/543
[58] Field of Search .......................... 53/54, 52, 53, 53/495, 494, 493, 500, 251, 235, 543

[56] References Cited

U.S. PATENT DOCUMENTS

| | | | |
|---|---|---|---|
| 4,918,907 | 4/1990 | Roach et al. | 53/251 X |
| 5,035,105 | 7/1991 | Qvarnström | 53/543 X |
| 5,488,815 | 2/1996 | Abrams et al. | 53/251 X |
| 5,528,883 | 6/1996 | Jamison | 53/251 X |
| 5,561,970 | 10/1996 | Edie et al. | 53/251 X |

*Primary Examiner*—James F. Coan

[57] ABSTRACT

An apparatus is provided for removing and transporting articles, such as contact lens sections from a manufacturing line to inspection and packaging stations. The lenses are deposited in a transparent plastic primary package which carries the lenses through the inspection station and becomes part of the primary package when a cover is sealed thereto. The invention includes various assemblies, including lens transfer assemblies, deionized water filling and removal assemblies, a water degassing assembly, a lens inspection assembly, and a lens package sealing assembly. The lenses are removed from pallets at a post hydration station, transported and spatially redistributed, and deposited in the primary packages disposed on a second set of pallets. The packages on the second set of pallets are filled with degassed deionized water. The contact lenses and packages are then transported to an inspection station. After inspection, the lenses and packages are transported to a water removal assembly, and then to another transfer assembly. This transfer assembly separates those lenses which passed inspection from those which did not, and places those that did in a consolidating assembly. The lenses and packages are then filled with saline solution and a foil label is then sealed thereto to form the primary package.

18 Claims, 13 Drawing Sheets

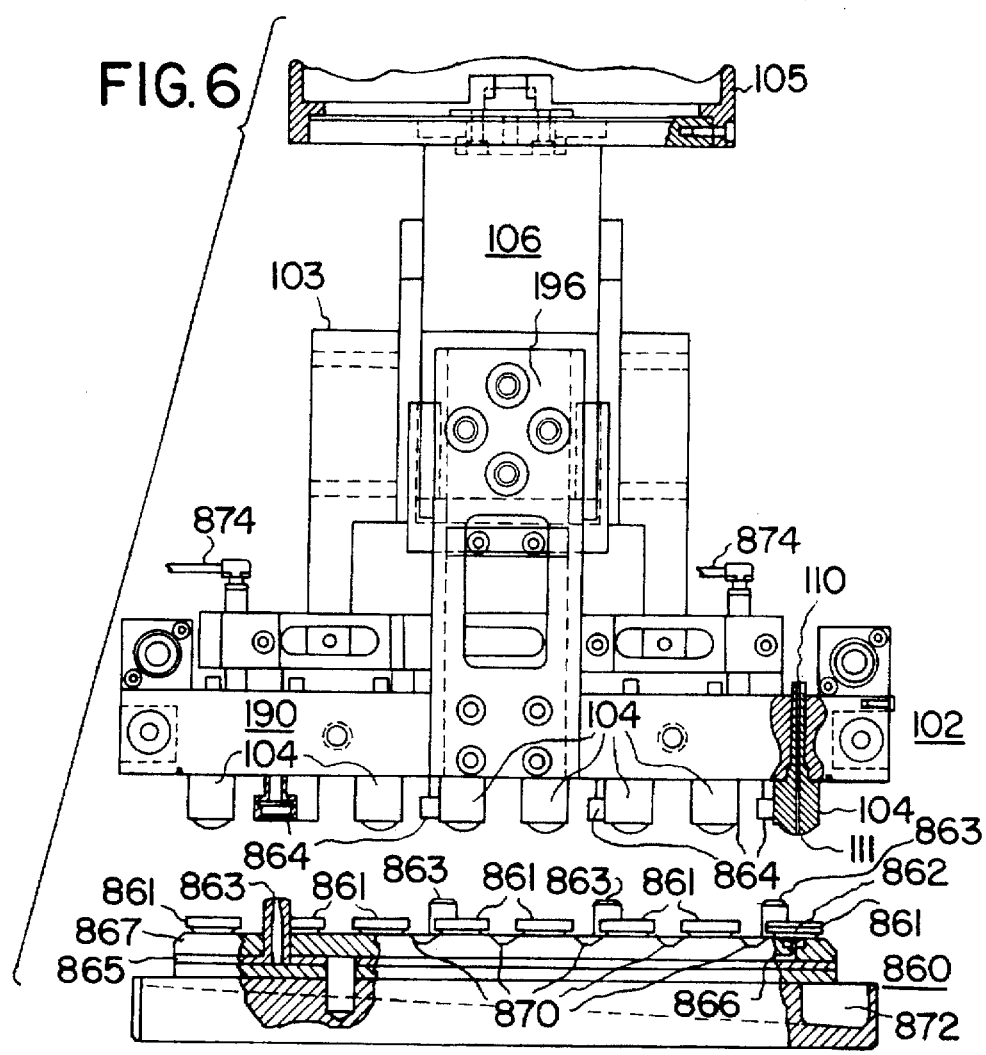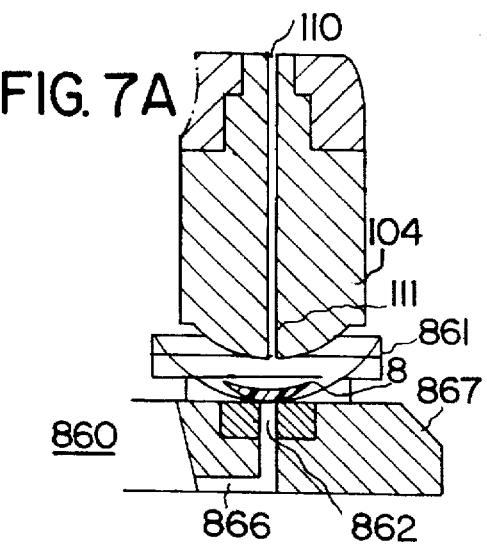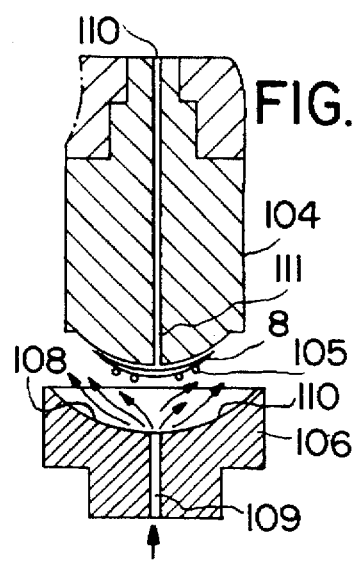

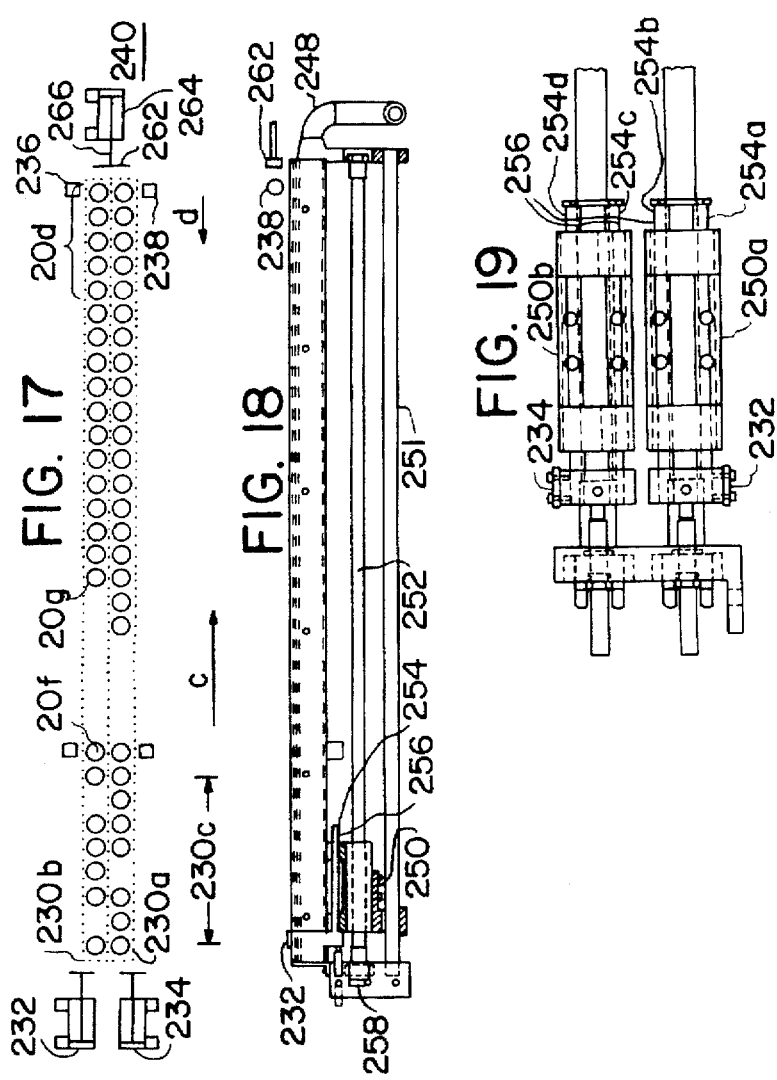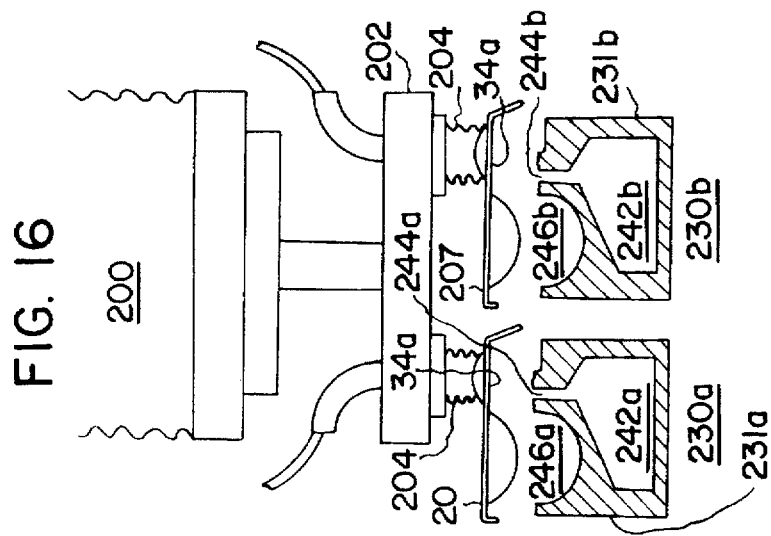

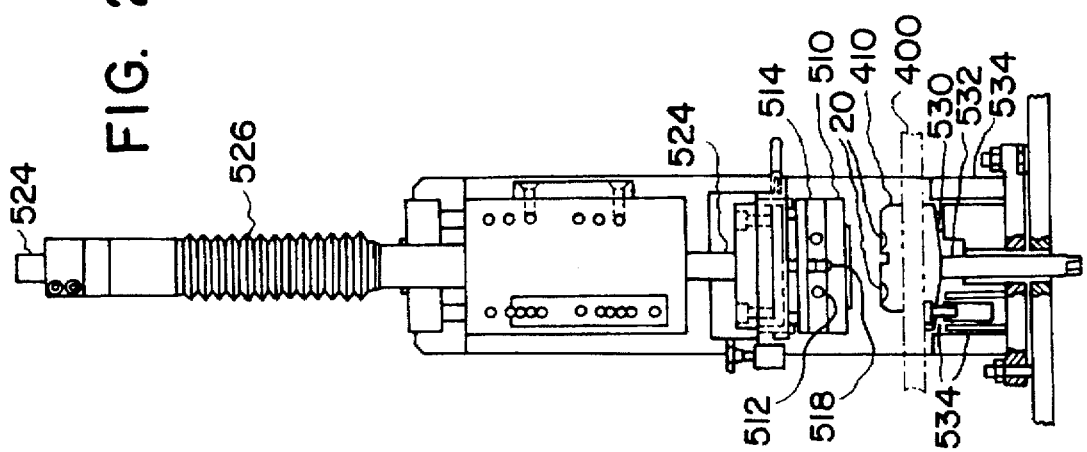
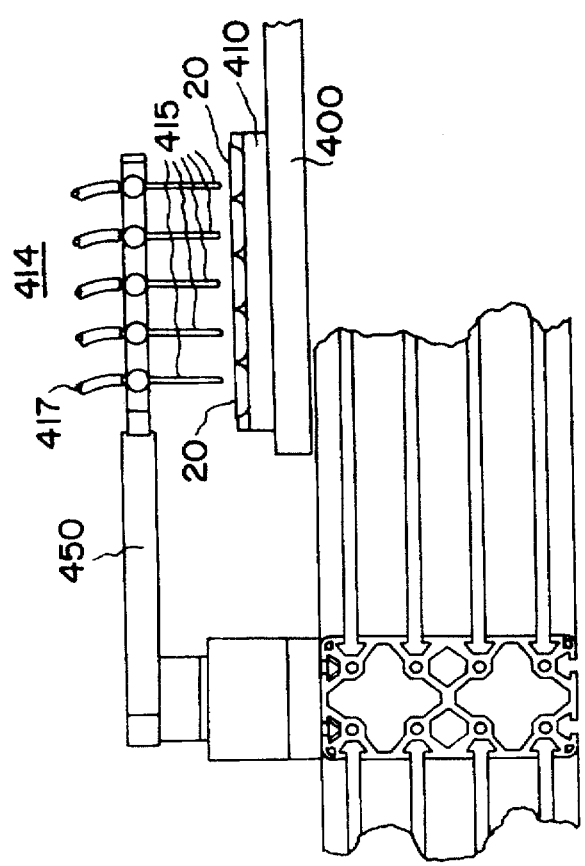

5,687,541

AUTOMATED APPARATUS AND METHOD FOR PREPARING CONTACT LENSES FOR INSPECTION AND PACKAGING

This is a divisional of application Ser. No. 08/258,557, filed on Jun. 10, 1994, now U.S. Pat. No. 5,578,331.

FIELD OF THE INVENTION

The present invention relates generally to the field of manufacturing ophthalmic lenses, especially molded, hydrophilic contact lenses, and more specifically to an automated apparatus for handling and preparing contact lenses for inspection and packaging.

DESCRIPTION OF THE PRIOR ART

The molding of hydrophilic contact lenses is disclosed in U.S. Pat. No. 4,495,313 to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by sandwiching a monomer or monomer mixture between a front curve (lower) mold section and back curve (upper) mold section, carried in a two by four mold array. The monomer is polymerized, thus forming a lens which is then removed from the mold sections and further treated in a hydration bath and packaged for consumer use.

U.S. Pat. Nos. 5,080,839 and 5,094,609 disclose respectively a process for hydrating contact lenses and a chamber for hydrating contacts lenses formed with a monomer or monomer mixtures disclosed in the forgoing patents. The process disclosed in these patents significantly reduces the thruput time by hydrating the lens and releasing the lens from the mold cavity with the deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then seal the lens within the package so that the final lens equilibrium (ionic neutralization, final hydration and final lens dimensioning) is accomplished in the package at room temperature or during sterilization.

U.S. Pat. No. 4,961,820, also assigned to the assignee of the present invention, discloses a final package for a contact lens, wherein the package is formed from a transparent polypropylene blister and a foil laminate that is heat sealed thereto.

While U.S. Pat. Nos. 5,080,839 and 5,094,609 contemplate that the entire hydration process and transfer to final packaging may take place in a fully automated fashion, and while the chamber and process described in the foregoing patents enabled automated handling of the lens during hydration, suitable automated equipment to prepare the lenses for inspection and to handle the lenses at high production rates to implement the methods thereof in a fully automated apparatus was not readily available or taught by the prior art.

SUMMARY OF THE INVENTION

Recent developments in the inspection of contact lenses produced in accordance with the foregoing methods has enabled automated lens inspection, as taught in U.S. Ser. No. 07/993,756, now U.S. Ser. No. 08/598,068 entitled "Lens Inspection Method and Apparatus", (VTN 0037) assigned to the assignee of the present invention. Further, recent developments in the hydration and automated handling of wet contact lenses, as taught in U.S. Ser. No. 08/258,556, now U.S. Pat. No. 5,476,111 "Automated Method and Apparatus for Hydrating Soft Contact Lenses" (Docket 8998), also assigned to the assignee in the present invention, has enabled automatic robotic handling of lenses during hydration, and prior to the inspection thereof by the automated lens inspection system.

It is an object of the present invention to provide an automated apparatus for handling and preparing contact lenses for inspection. It is further an object of the present invention to provide an automated apparatus for handling and preparing contact lenses for inspection and packaging wherein the lenses are inspected and packaged in the same carrier.

It is an object of the present invention to provide a robotic device for transferring a plurality of soft contact lenses from a first processing station to a second processing station wherein the robotic device includes an adjustable array of convex contact lens carriers thereon. The adjustable array is particularly useful for transferring contact lenses between processing stations wherein the first station includes a plurality of first contact lens carriers arranged in a first array with each of said carriers having a concave lens holding surface and a contact lens to be transferred therein. Each of these concave lens holding surfaces may also define a first fluid port for introducing a fluid between the concave surface and the lens. The robotic head which facilitates transfer of the lens between the processing station includes a plurality of second contact lens carriers in an adjustable array with each of the second carriers having a convex lens attachment surface which receives a contact lens thereon, and a second port for introducing a fluid between the contact lens and the convex lens convex surface. The robotic device may be equipped with articulated motorized arms and a control circuit for moving the robotic transfer head between the first and the second processing stations, and may further include a fluid supply means for supplying a fluid to the first and second fluid ports to thereby transfer the lens therebetween. The second processing station may include a second frame having a plurality of third contact lens carriers arranged thereon in a third array for receiving the contact lenses transferred thereto, wherein the arrangement of third array of contact lens carriers is not the same as the arrangement as the first array of first contact lens carriers, and the robotic transfer head includes an adjustable array for matching the first frame for contact lens pickup, thus changing its configuration to match the second frame for contact lens discharge.

It is further an object of the present invention to provide for transfer of the lens between carriers with degassed and deionized water to facilitate the inspection thereof in the automatic inspection means. It is further an object of the present invention to provide a device for removing air bubbles that may have formed on the surface of the lens prior to the inspection thereof in the automatic lens inspection system.

It is further an object of the present invention to provide an improved method of inspecting molded contact lenses wherein the lenses are inspected in deionized and degassed water to minimize the formation of air bubbles which would create false negative automatic lens inspection data.

It is further an object of the present invention to provide an improved method for manufacturing soft contact lenses wherein the lenses are first molded in disposable contact mold frames, and then hydrated and inspected in degassed and deionized water, and then packaged in a saline solution to enable the Lime consuming ionic neutralization of the polymerized lens to occur in the final package. It Is further an object of the present invention to provide the foregoing method of manufacturing with a consolidation step for removing defective lenses from the line of inspected lenses prior to packaging.

It is another object of the present invention provide for inspection of the contact lens in degassed and deionized water and to provide for the automatic removal of the deionized water following inspection thereof.

Finally, it is an object of the present invention to provide for a transfer of the contact lenses from the hydration station to the inspection station with a bubble blow off station to remove air bubbles that would otherwise create false negative automatic lens inspection reports.

While the invention is described with particular reference to molded contact lenses wherein the lens has been molded between a first and second mold half, as described in U.S. Ser. No. 08/258,654 "Consolidated Contact Lens Molding" (Docket 9016) it is understood the present consolidation apparatus is equally suitable for the consolidation of lenses formed by lathe cutting wherein the hydrogel is maintained at a dry state while the desired optical surfaces are cut and polished. Further, the apparatus of the present invention may also be used in consolidating spin cast lenses which subject a liquid monomer to centrifugal force in a mold which has the same shape as the desired optical surfaces of the lens.

BRIEF DESCRIPTION OF THE DRAWINGS

The foregoing objects and advantages of the present invention for an automated apparatus and method for consolidating products for packaging may be more readily understood by one skilled in the art with reference being had to the following detailed description of the preferred embodiments, taken in conjunction with the accompanying drawings, wherein like elements are designated by identical reference numerals throughout the several views, and in which:

FIG. 6 is a plan view of an articulated robotic transfer head having an adjustable array of convex lens carriers positioned immediately above a hydration carrier having a plurality of contact lenses therein.

FIG. 7(a) is a cross-section and diagrammatic illustration of the transfer of a wet contact lens from the concave lens holding surface of a hydration carrier to the convex holding surface of the articulated robotic transfer head.

FIG. 7(b) is a cross-section and diagrammatic illustration of a bubble blow off mechanism for removing air bubbles from the contact lenses that might otherwise create false negative automatic lens inspection results.

FIG. 16 is a diagrammatic illustration of on individuated robotic handling device transporting contact lens carriers to a vacuum rail consolidation buffer used in the present invention.

FIG. 17 is a diagrammatic illustration illustrating in conceptual form a consolidation buffer used in the present invention.

FIG. 18 is an elevation view of a vacuum rail consolidation buffer used in the present invention.

FIG. 19 is an enlarged plan view of the drive mechanism utilized in the vacuum rail consolidation mechanism of FIG. 18.

FIG. 20 is a diagrammatic and partially cross-sectioned illustration of the apparatus used to fill the package carriers with saline solution in the final packaging of the present invention.

FIG. 22 is a partially cross-sectioned elevational side view of the apparatus illustrated in FIG. 21.

DETAILED DESCRIPTION OF THE PREFERRED EMBODIMENTS

The present invention was designed for and is particularly adapted for use in the post hydration processing section of an automated contact lens production facility. Contact lenses molded in an automated production line, such as that described in co-pending application U.S. Ser. No. 08/258, 654 entitled "Consolidated Contact Lens Molding"; hydrated in a hydration system as described in U.S. Ser. No. 08/258,556, now U.S. Pat. No. 5,476,111 , entitled "Automated Method and Apparatus for Hydrating Soft Contact Lenses"; and automatically inspected as described in U.S.

Ser. No. 07/993,756, now U.S. Ser. No. 08/598,068 entitled "Lens Inspection Method and Apparatus" are particularly benefited by the present invention.

Post Hydration Processing

The present invention envisions a multi-purpose disposable lens package carrier which transports a contact lens during inspection thereof, and serves as a portion of the final packaging after inspection.

Figure 10:
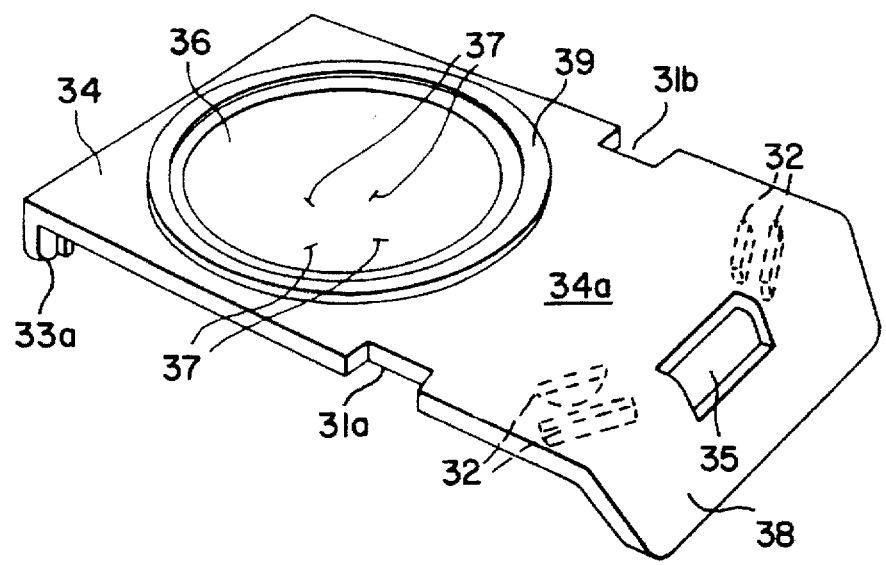
FIG. 10 is an isometric view of a contact lens carrier which serves as both an inspection carrier, and a portion of the final contact lens package.

A suitable package carrier 20 is illustrated in FIG. 10 and is formed from injection molded or thermal formed plastic sheet material, such as polypropylene and includes a planar essentially rectangularly shaped base member 34 having an angularly depending wall portion 38 at one end thereof forming a first flange member and a pair of registration flanges 33(a),33(b), one of which is visible in FIG. 10, at the other end thereof which are used to align the package carrier for robotic handling. This package carrier is more fully described in co-pending application U.S. Ser. No. 995,607, the disclosure of which is incorporated here by reference thereto. Registration notches 31(a), (b) are provided on either side of the base 34 to cooperate with registration pins on various support pallets used in the processing and packaging operations to register the package carrier and lens for further handling or treatment. Offset from the center of the package is a cavity 36 integrally formed therein which is of an essentially semi-spherical configuration, generally in conformance with a curvilinear shape of a contact lens (not shown) which is adapted to be stored therein in a sealed condition while immersed in a suitable sterile aqueous solution in a manner similar to that described in U.S. Pat. No. 4,691,820 to Martinez; which is assigned to the assignee of the present invention, the disclosure of which being incorporated herein by reference thereto. The height "h" of flange member 38 depending from the planar base member 34 is complimentary to the height or depth of cavity 36, and provides for self alignment of the package carrier in cooperation with depending flanges 33(a),(b) on specially configured pallet carriers, as will hereinafter be described. Depending flange 38 is also used in the final packaging of the product in cooperation with a plurality of generally "chevron-shaped" ridges 32, which will subsequently assist in supporting the cavity structure of an inverted and superimposed package carrier when said packages are to be cartoned for final distribution.

The cavity 36 also includes a plurality of tick marks 37 which are used to assist in holding a contact lens in the centered position in the cavity during the removal of deionized water at one of the post hydration processing stations. The package carrier is also equipped with an annular flange 39 which is used for heat sealing a foil laminate cover in order to provide a hermetic seal for the contact lens during final distribution. A cut-out 35 is used to facilitate gripping the flange 38 and the package when the cover stock or foil laminate is removed by the consumer to use the lens.

Base member 34 also includes a smooth planar surface 34(a) to provide a suitable engagement zone for vacuum grippers on the upper side, and a vacuum rail on the lower side, which are used to transport the package carrier during various stages of the operation.

Figure 11:
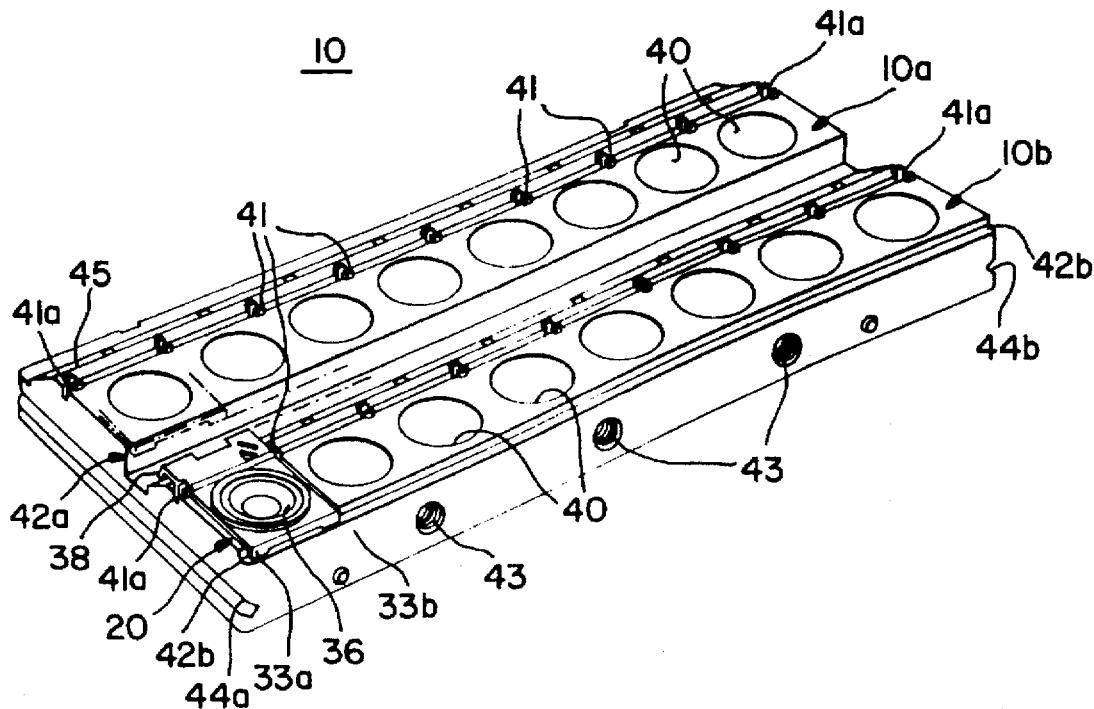
FIG. 11 is an isometric view of an inspection carrier used to transport a plurality of the contact lens carriers illustrated in FIG. 10 through the automated lens inspection system.

An inspection carrier for transporting the package carriers through the automated lens inspection system is illustrated in FIG. 11. The inspection carrier 10 includes a first and second row 10(a), 10(b) of cavities 40 which receive the bowl 36 of the package carrier and provide an optical sight path for the automated lens inspection system. Each of the intermediate registration pins 41 engage a package carrier on either side, with the end registration pins 41(a) engaging a single package. These registration pins engage the registration notches 31(a), (b) in the package carriers and provide for precise registration of the package carrier in the longitudinal dimension of the inspection carrier while a pair of hard edges 42(a), 42(b) provide a reference point for the downwardly descending flanges 33(a), 33(b), which together with pins 41 register the carrier package against rotational skewing. The inspection pallet 10 is further provided with three registration openings 43 on either side of the pallet which are used to transport the pallet through the automatic lens inspection station and to lock the pallet in place during loading and unloading of the package carriers. The inspection pallet is further provided with a pair of grooves 44(a), 44(b) which provide a positive grip for an overhead transport mechanism that places and then removes the inspection pallet from the automatic lens inspection system. A pair of slanted faces 45 provide clearance for the downwardly descending flange member 38 of the package carrier 20.

Figure 3:
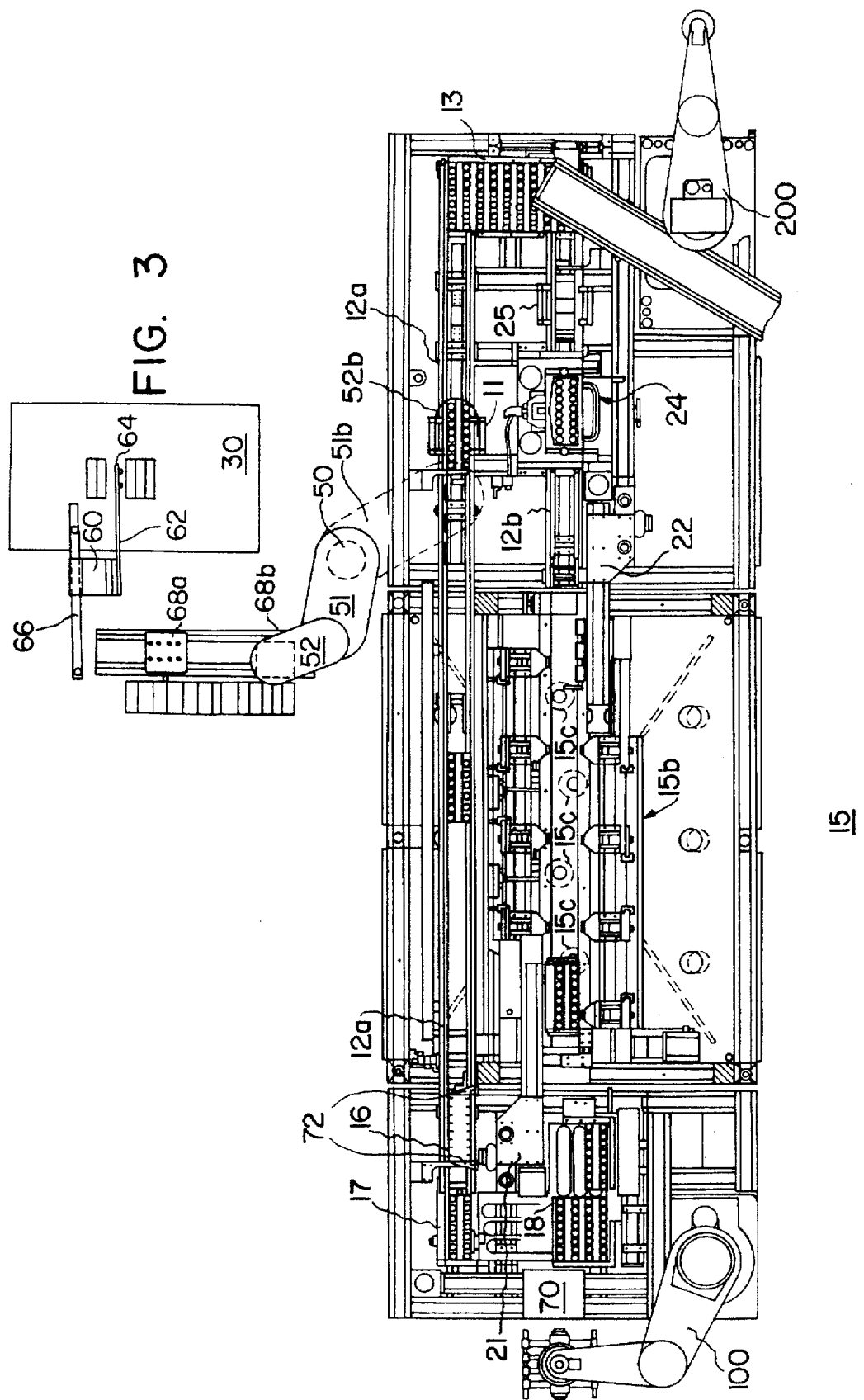
FIG. 3 is a plan view of the apparatus illustrated in FIG. 2.

As illustrated in FIG. 3, an injection mold machine 30 is used to mold the polypropylene lens carriers 20 which serve a dual purpose in the invention concept. First, to provide a carrier for the inspection of the lens by the automated lens inspection system, and secondly, to provide a receptacle for the final packaging of the lens for distribution to end use consumers. These package carriers are molded in predetermined array, typically in a 4×4 cluster of sixteen package carriers per mold cycle, and removed from the injection mold by a robotic transfer means 60 having a rapidly reciprocating low mass transport carrier 62. The carrier 62 includes a hand member 64 having a plurality of vacuum gripper means thereon which are arranged to correspond to the array of mold cavities within the injection molding machine 30. Carrier 62 reciprocates along support member 66 and is rotatable from a vertical orientation as illustrated in FIG. 3, to a horizontal orientation necessary to place the packaged carriers into a secondary transfer shuttle 68. Secondary transfer shuttle 68 is used to transport a plurality, i.e. sixteen of the package carriers from a first receiving position 68(a) illustrated in FIG. 3 to a second position 68(b) where the package carriers are picked up by a robotic handling device 50. Robotic handling device 50 is articulated, having first and second arms 51, 52 and a vertically reciprocating arm and hand (not shown) having a plurality of vacuum gripping means thereon which engage each of the package carriers transported by the transfer shuttle 68.

The package carriers 20 are then removed from the transfer shuttle 68 and placed on an inspection pallet 10 at a pallet loading station 11. In the preferred embodiment the package carriers are molded in a 4×4 array to maximize the efficiencies inherent in such an array for molding, which are transported in the inspection pallet 10 in a 2×8 array. When these two arrays are used, robotic handling device 50 makes two separate transfers, and transfers a 2×4 array in each transfer. The loaded pallet 10 is then moved by conveyor 12(a) to a deionized water injection station 16 wherein each of the package carriers transported on the inspection pallet are partially filled with degassed and deionized water. The inspection pallet is then transferred by a push conveyor 17 to a lens loading area 18 where it is hatched with a second pallet to provide a contiguous loading area with thirty-two package carriers, each of which has been dosed with degassed and deionized water.

Deionized Water Degas

The present invention utilizes degassed and deionized water with a small amount of surfactant therein as an inspection media for the Automatic Lens Inspection System described in U.S. Ser. No. 07/993,756, now U.S. Ser. No. 08/598,068.

When only deionized water is used in the package carrier bowl, friction or hydrophobic attraction between the contact lens and the surfaces of the carrier that form the recesses may occasionally prevent the lenses from moving or sliding completely into the desired, predetermined positions. For example, in one known process, contact lenses are formed from a liquid hydrogel monomer, which is polymerized in the presence of an inert diluent such as boric acid ester, as described in U.S. Pat. No. 4,495,313. The inert diluent fills up the spaces in the hydrogel lens during polymerization, and the diluent is subsequently exchanged for deionized water during a hydration process.

After this hydration process is completed, small amounts of the acid groups may remain on the lens surface. When the lens is placed inside the recess of the lens carrier, these acid groups may cause the lens to stick to the surface of the bowl of the carrier. Without freedom of movement, the lens might not move completely into the desired predetermined position. When this happens and the lens is subsequently inspected using an automatic Lens Inspection System, the lens may be rejected for being outside the field of view, or may otherwise be erroneously identified as irregular or imperfect.

In application U.S. Ser. No. 08/258,266, entitled "A Method of Positioning Ophthalmic Lenses", the disclosure of which is incorporated herein by reference thereto, a solution to this problem was described in which a small amount of surfactant was added to the deionized water. The surfactant reduces the friction and retards the hydrophobic attraction between the lens and the surface of the holder forming the recess, helping to insure that the lens is pulled into the desired, predetermined position.

Any suitable surfactant may be used in the practice of the invention. For example, the surfactant may be polyoxyethylene 20 sorbitan monooleate, more commonly known as Polysorbate 80, or tween 80 or tween 80 k$^c$. It has been found that the addition of tween 80 at a concentration as low as 25 parts per million parts of solution allows the lens to move in package carrier 20 without sticking. Larger amounts of the surfactant may be used, and for example, the weight percent concentration of the surfactant in the solution may be between 5.0% and 0.01%. The surfactant may be mixed in any suitable liquid carrier, such as deionized water, to form the desired solution.

Preferably, the surfactant concentration in solution is in the lower end of the above-given range, and for example, the surfactant concentration may be below fifty parts per million parts of deionized water. Using the surfactant at this lower concentration helps to avoid, or to reduce, any foaming or bubbling of the surfactant in the solution and helps to reduce subsequently the surfactant concentration below a predetermined level.

Degassed water is preferred to the prevent the formation of air or gas bubbles when the water emerges from a pumped high pressure fluid line into a low pressure (atmospheric) environment. When deionized water which has not been degassed is used, small air bubbles may form in the package before the lens is transferred or, on the contact lens when it is transferred to the package carrier. These bubbles are formed from dissolved gasses in the deionized water which are "seeded" by the lens or a small irregularity in the package carrier surface.

Figure 13:
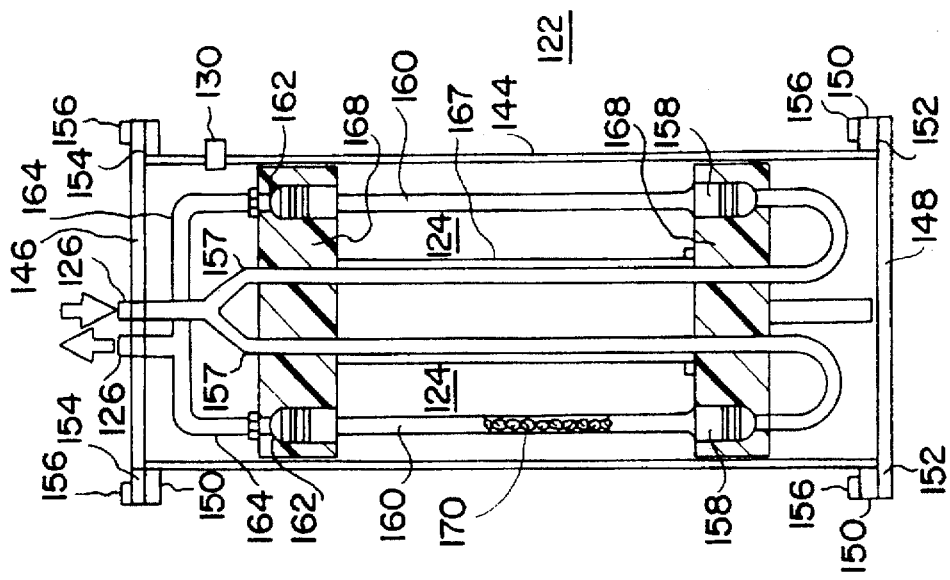
FIG. 13 is a detailed elevation view illustrating in section the degas unit used to degas the deionized water.
Figure 12:
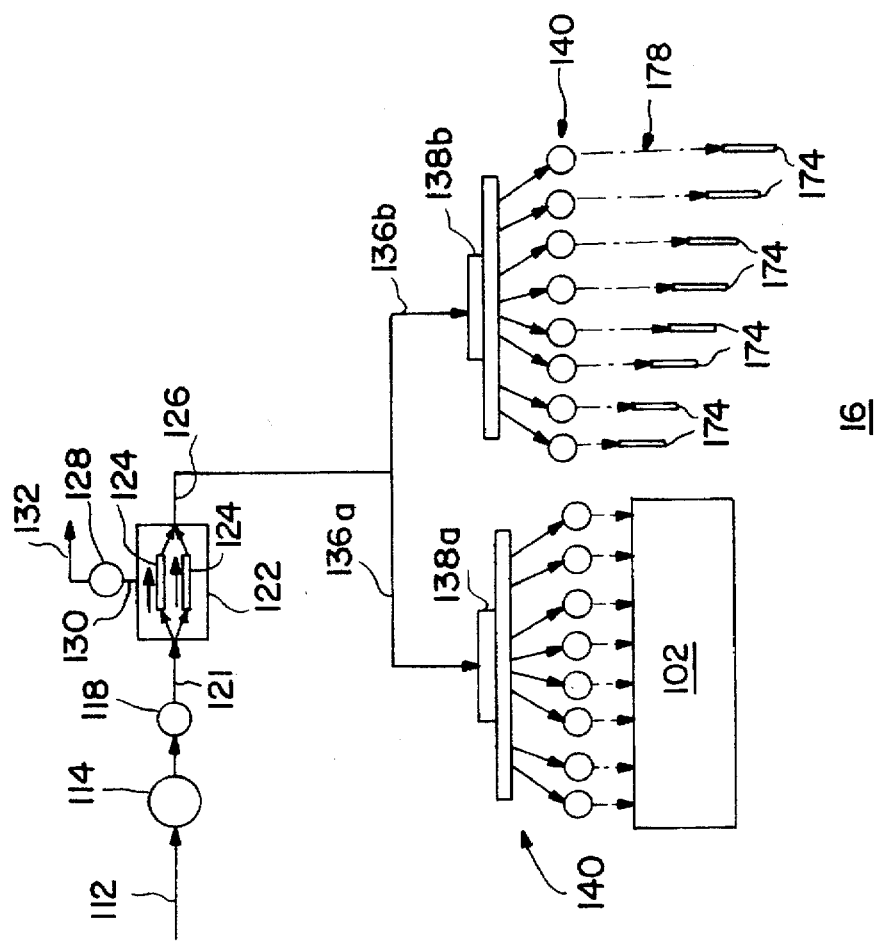
FIG. 12 is a diagrammatic illustration illustrating the components of the deionized water degassing system of the present invention.

The apparatus for degassing the deionized water is illustrated in FIGS. 12 and 13. FIG. 12 is a diagrammatic illustration of the degas module, while FIG. 13 is a detailed elevation view as the degas unit. Deionized water is provided through input line 112 from a deionized water source, which may be the same source as that used for hydration. If drawn from a container, a optional pump 114 may be provided.

The deionized water then passes through filter 118 in order to remove extraneous particulate contaminates that may be present in the water.

The deionized water is then provided to the inlet 121 of the degas unit 122. Within the degas unit, the deionized water is divided among a plurality of tubes 124, and then recombined into a degas unit discharge 126. The degas unit is operated under a low ambient pressure typically from 4 to 25 torr which is provided by vacuum pump 128. This vacuum pump is attached to the degas unit 122 by line 130 and discharges the excess air from the degas unit by way of line 132.

After the deionized water exits degas unit 122 by discharge line 126, it passes through line 136(a), (b) into manifolds 138(a), (b). The manifolds are used as a common source to supply a plurality of precision dose pumps 140 that fill individual contact lens package carriers at the dosing station 16 and the robotic transfer array 102 mounted on robotic transfer device 100. The pumps 140 used to pump the degassed and deionized water to manifold 138 are F.M.I. pumps (Fluid Metering, Inc., Oyster Bay, N.Y.) that are mounted to drive units manufactured by Oyster Bay Pump Works, Inc., Oyster Bay, N.Y. These pumps provide precision doses of degassed and deionized water solution to pre-wet the package surface thereby reducing bubble formation and lens sticking, to avoid overfilling (i.e. water on the sealing area of the package) and to promote the proper water level for the inspection system.

Turning now to FIG. 13, there is shown in greater detail the monomer degas unit 122. The degas unit is comprised of a pressure boundary consisting of an outer cylindrical wall 144, a top plate 146 and a bottom plate 148. Contained within the cylindrical side wall 144 is a port 130, which is connected to vacuum pump 128 (not shown).

Top plate 146 and bottom plate 148 are attached to the cylindrical side walls 144 by use of flanges 150 compressed upon O-rings 152 and 154 found on the bottom and top plates, respectively. Compression of the O-rings and attachments of plates 146 and 148 to flanges 150 is accomplished by bolts 156 that attach the plates to the flanges.

Passing through top plate 146 is the water inlet line 121. This inlet line passes through the top plate 146, divides within the chamber 122 by means of a "Y" connector into two or more lines 157 of equal length. Lines 157 are preferably of equal length in order to provide equal back pressure resulting in equal flow through both lines to two separate headers 158. Each of these headers is connected to ten silicon tubes 160 which are permeable to gas. The tubes 160 are arranged in a 3- 4- 3 offset array, 0.300 spacing center-to-center. The flow through the tubes is from the bottom up in order to fill the tubes and not entrain voids in the liquid. A static mixer 170 is provided in each of the tubes 160 to increase the efficiency of mass transfer. These static mixtures are made of Delrin, ¼ inch in diameter and 6 inches long, as produced by Koflo, Inc. of Carrie, Ill.

The internal structure of the degas unit stands off the bottom of chamber with stainless steel pipe 167 supporting Delrin blocks 168 at the desired separation and these blocks, in turn, support manifolds 158 and 162 containing therebetween extended gas permeable tubes 160. Alternately the degas unit may be suspended from top flange 146.

During its time of residence in the silicon tube 160 in the low pressure degas chamber 144, dissolved gasses migrate out of the deionized water through tube wall 160, drawn out by the vacuum pump through chamber outlet 130. As the water approaches the top of the chamber it is essentially free of dissolved gasses.

The silicon tubes near the top of the chamber are connected to second headers 162 which combine silicon tubes 160 back into common tubes 164. These tubes may also be made of a silicon, or may be made of an impervious material. They are of the same length in order to avoid pressure differences which could result in flow imbalances. Tubes 164 are then connected in a "Y" fashion to provide a single degas unit outlet 26.

The preferred material for the gas permeable tubing is STHT tubing produced by Sanitech Inc. of Andover, N.J. from Q74780 medical grade silicone rubber manufactured by Dow Corning of Midland, Mich.

The apparatus is arranged so that each set of tubes 124 contains ten tubes, each ¼ inch inner diameter with a wall thickness of 1/32 inch, having a 80 durometer hardness.

Pre-Inspection Preparation

Figure 1:
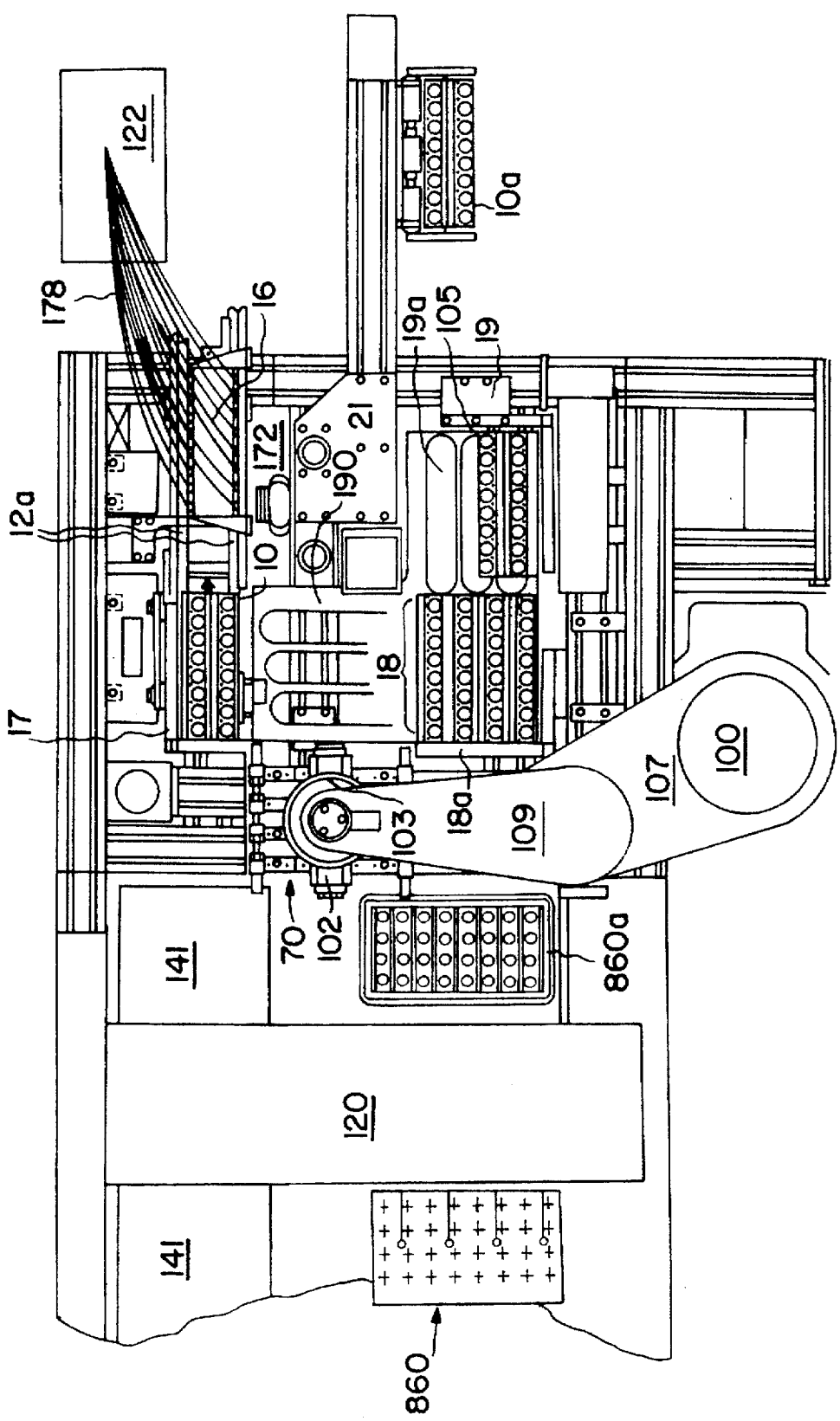
FIG. 1 is a diagrammatic and plan view of an apparatus which fills a package carrier with degassed deionized water, removes the molded contact lenses from the final hydration stage, and places the contact lenses in a specially configured inspection pallet for the automatic optical inspection thereof.
Figure 2:
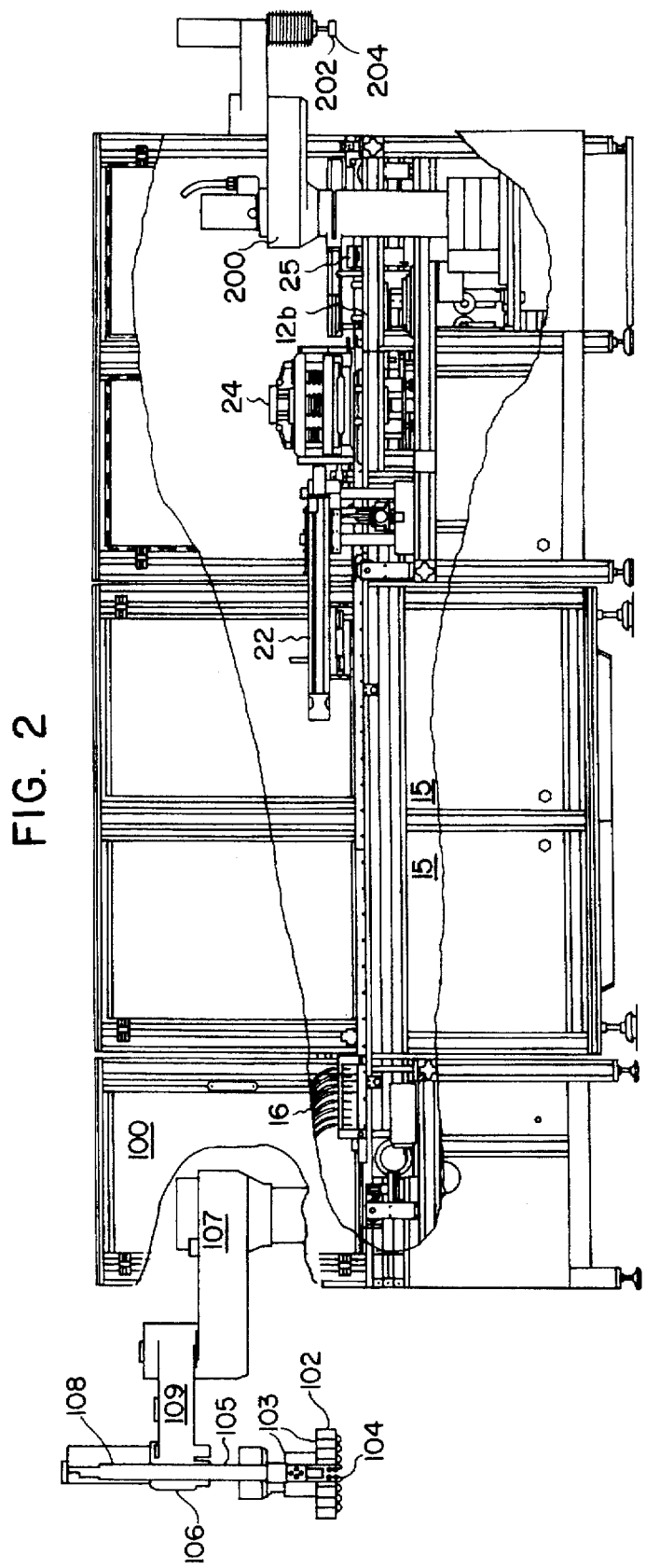
FIG. 2 is an elevation view of the automated lens inspection system and the stations utilized in the handling of the lenses after hydration and prior to the automated lens inspection.

The apparatus of the present invention that prepares the contact lenses for inspection and subsequent packaging is best illustrated in FIG. 1 which is an enlarged view of a portion of the apparatus illustrated in FIGS. 2 and 3 with particular emphasis on the transition between the hydration line and the post-hydration line of the present invention.

The present invention is particularly adapted for use in conjunction with the invention disclosed in U.S. Ser. No. 08/258,556, now U.S. Pat. No. 5,476,111, entitled "Automated Method and Apparatus for Hydrating Soft Contact Lenses", assigned to the assignee of the present invention, the disclosure of which is incorporated herein by reference thereto.

As illustrated in FIG. 1, a second hydration carrier 860 having a top chamber plate mounted thereon is advanced into the separation station 120 for removal of the top chamber plate and transferred to the return conveyor 141. The hydration base emerges from the separation station 120 to the position illustrated at 860(a) having a plurality, e.g., thirty-two contact lenses 8 therein, with a single lens carried in each of the convex lens carriers attached thereto. An articulated robotic transfer device 100 having an adjustable 4×8 array 102 of convex lens carriers then positions the array over the second hydration carrier 860(a) as illustrated in FIGS. 6 and 7(a).

As illustrated in FIG. 7(a), a single contact lens 8 is carried within the concave lens carrier 861 and is positioned immediately below a convex lens carrier element 104 mounted on the 4×8 array 102. The concave carrier 861 includes at least one port 862 for introducing a fluid between the surface of the concave lens carrier element, and the lens 8. The fluid is supplied through a channel 866 cut into the lower side of upper plate member 867, which communicates with a fluid manifold and a plurality of upstanding fluid connectors 863 which extend above the surface of the concave lens carrier elements 861 as best illustrated in FIG. 6. The fluid connectors 863 are adapted to engage fluid couplings 864 formed on the underside of the 4×8 array 102. Each of these couplings is connected to a fluid conduit 874 which supplies a transfer fluid for the transfer of the contact lens 8 from the concave lens holding means 861 to the convex lens holding means 104.

In the embodiment illustrated in FIG. 6, and in particular for the transfer of contact lenses from the hydration carrier 860 to the robotic array 102, a pneumatic fluid transfer is desired, and thus conduits 874 provide pressurized air to the coupling members 864 which in turn supply the pressurized air to fluid coupling 863 to the channel passageway 866, and the port 862.

As illustrated in FIG. 7(a), the contact lens 8 is still wet having recently been hydrated and flushed in the hydration station. Further, the lens has been hydrated with deionized water having a small amount of surfactant therein which may be advantageously employed to promote the handling of the wet contact lens by centering the lens within the concave surface of lens holding means 861. When the air pressure lines 874 are actuated, a puff of air will emerge through the port 862 and lift the contact lens upwardly from the surface of the concave carrier and into engagement with the convex lens carrier element 104. While the lens will adhere to element 104 with or without the surfactant, the surfactant wets the surface of the convex carrier element 104 and promotes adhesion thereto by virtue of the surface tension of the deionized water and the surrounding atmospheric pressure. In the transfer, it is desirable to position each of the convex carrier elements 104 within 1.5 mm of the lens to ensure a direct and precise transfer.

After transfer of the lens 8 to the convex element 104, the robotic transfer device then moves the array of lenses to a "bubble blow off" station 70 illustrated in FIG. 3. In FIG. 1, the 4×8 array 102 overlies station 70.

The bubble blow off station 70 includes a manifold arrangement similar to manifold 860 with a plurality of cup members 106, each of which has a concave surface 108 of approximately the same configuration as the convex surface of the second lens carrier element 104. While a concave surface such as surface 108 has been found to be desirable, a single jet device will also provide the same function. The concave surface 108 also includes at least one port 110 defined therein for admission of pressurized fluid through a central passageway 109 formed in the cup member. The use of a small amount of surfactant in the deionized water promotes the transfer of the lens from first to second carrier elements, but also enables the formation of small air bubbles 105 in the layer of deionized water which coats the contact lens 8. By subjecting the lens to a jet of pressurized fluid, the small bubbles 105 are migrated outwardly and dissipated prior to the transfer of the lens to the inspection carrier. Removal of the air bubbles is desirable to avoid false negative reports from the automatic lens inspection system which is used to inspect the lenses. While pressurized air is used in the preferred embodiment of the invention, deionized water is also suitable.

Package Carrier Dosing

Figure 15:
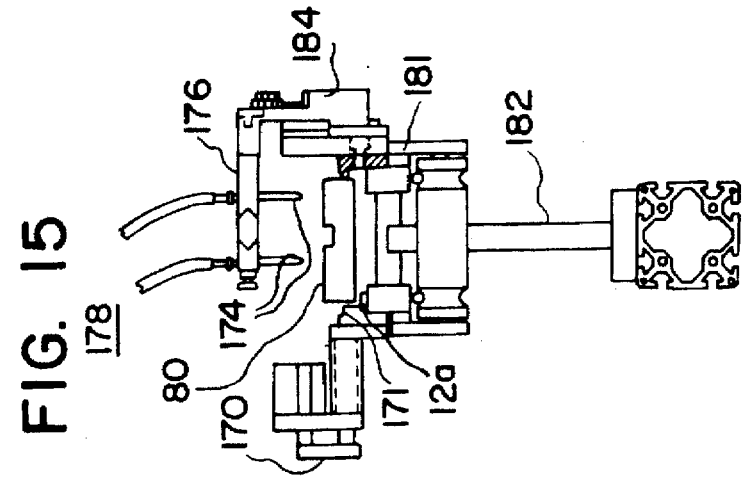
FIG. 15 is a partially cross-section elevation and end view of the apparatus illustrated in FIG. 14.
Figure 14:
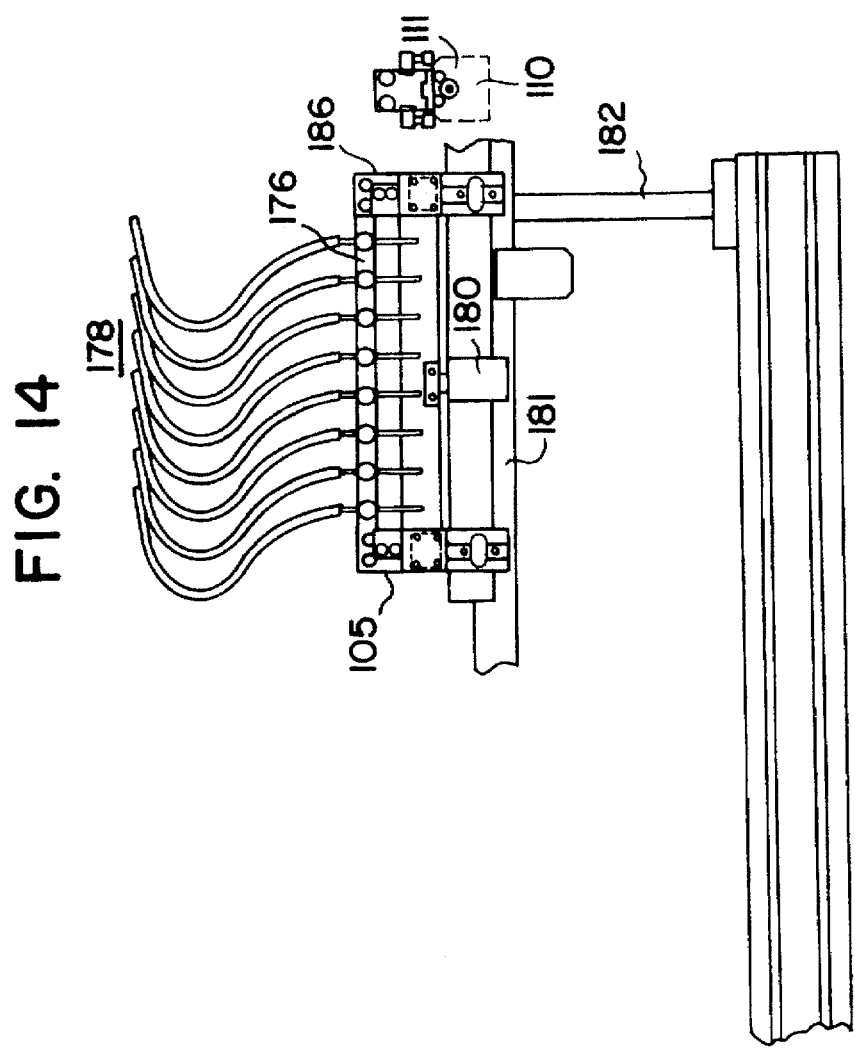
FIG. 14 is an elevation and side view of an apparatus used for filling package carriers with degassed and deionized water in accordance with the practice of the present invention.

As was described earlier with respect to FIGS. 12 and 13, deionized water is degassed in a degas unit 122 and distributed by a plurality of precision dosing pumps 140 to a deionized water dosing station 16, which is more fully illustrated in FIGS. 14 and 15. As illustrated in FIG. 15, a rubber belt conveyor 12(a) having a pair of belts carries the inspection carrier 10 from the package carrier loading area 11 (illustrated in FIG. 3) to the deionized water dosing station 16. A pneumatic stop 170 having a paul 171 is used to hold a series of inspection carriers 10 upstream of the dosing station 16. When a new inspection carrier 10 is to be loaded, the pneumatic stop mechanism 170 retracts paul 171, allowing the inspection carrier 10 to be carried into the dosing station on conveyor 12(a). A separate set of jaws mounted on a pneumatic locking mechanism 172 (illustrated in FIG. 1) engage the inspection pallet 10 and hold it securely in position for package dosing. A plurality of dosing nozzles 174 are mounted on a horizontal reciprocating beam support member 176 and are connected to the F.M.I. pumps 140 by virtue of a plurality of tubing members 178 with a separate pump for each nozzle. Each of the nozzle members 174 terminates in a sixteen gauge teflon needle having an ID of 0.045 inches –0.048 inches which is suspended directly above the package carriers 20, and more particularly, above the bowl member 36. In operation, a pneumatic cylinder 180 which is fixably secured to support frames 181 and 182 reciprocates carriage member 184, vertical supports 185, 186 and the horizontal mounting beam 176 to enable the teflon needle tips to be lowered into the recessed bowl 36 of the package carriers 20. The tips are reciprocated downwardly, and approximately 600 microliters of degassed and deionized water is injected therethrough to partially fill the bowl 36. After the bowls are filled with the desired dosage, pneumatic cylinder 180 is actuated and the reciprocal support beam 176 is raised to lift the teflon needles free of the package carriers 20. The use of a reciprocating dosing needle eliminates agitation or splashing in the dosing of the degassed and deionized water. Undue agitation or splashing may also lead to the enlargement of air and the formation of air bubbles which may generate a false negative inspection signal. The inspection carrier 10 is then advanced out of the dosing station 16 to the end of conveyor 12(a) where it engages a push conveyor 17, driven by a servo motor, which pushes the inspection carrier 10 across a stainless steel platform 190 to the lens loading area 18. The lens loading area 18 is specifically designed to accommodate two inspection pallets 10 and provide a ganged array of thirty-two package carriers for receipt of thirty-two individual contact lenses. When these two inspection pallets 10 are in the lens transfer position 18, tapered pins (not shown) engage registration cavities on the pallets (2 per pallet) and provide precise positioning during lens transfer.

While 2×8 and 4×8 arrays have been utilized in the post-hydration processing section of the present invention, it is understood that a variety of array configurations could be utilized in the practice of the present invention.

The 4×8 array of the hydration carrier 860 is different than the 4×8 array of package carriers in the lens loading area 18. The second 4×8 array 102 mounted on robotic transfer means 100 is adjustable to accommodate the first 4×8 array in the second hydration carrier 860 which has 30 mm centers between lenses, and the "bubble blow off" station 70, and then expands to 30×50 mm centers, which is the dimension of the third 4×8 array at the lens loading area 18 as will be hereinafter described with respect to FIGS. 8 and 9.

Figure 9:
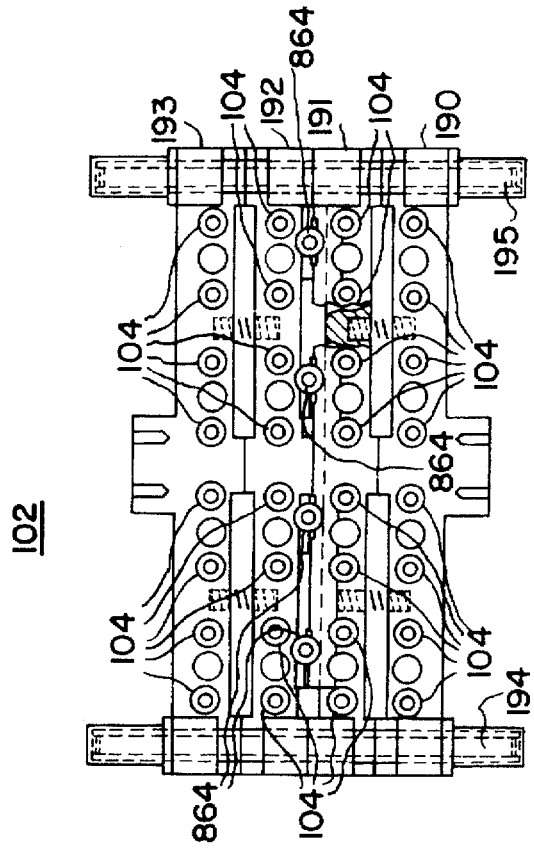
FIG. 9 is a diagrammatic and partially cross-sectioned illustration of the articulated robotic transfer head in plan view in a closed position, as illustrated from below.
Figure 8:
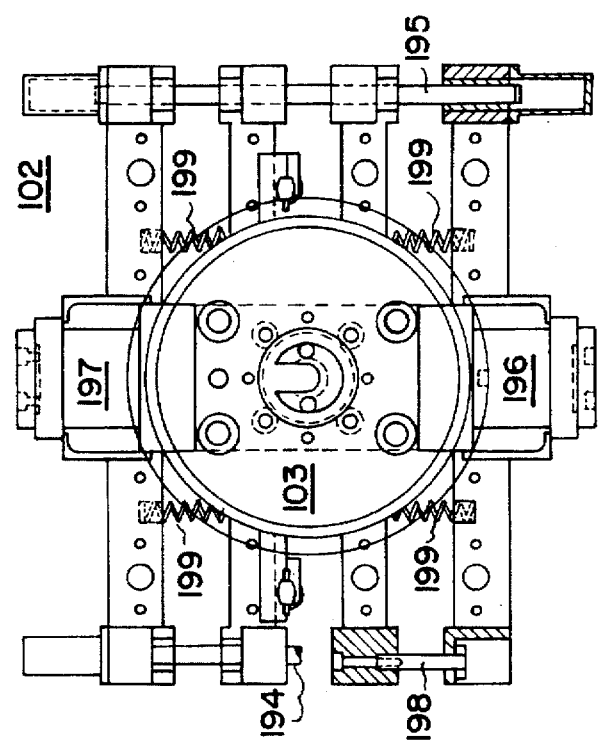
FIG. 8 is a diagrammatic and partially cross-section plan view of the articulated robotic transfer head in the expanded position, as viewed from above.

As illustrated in FIGS. 8 and 9, the 4×8 array 102 is illustrated in an expanded configuration in FIG. 8, and a collapsed configuration in FIG. 9. The array 102 includes thirty-two convex lens carrier elements 104 as previously described with respect to FIGS. 6 and 7. Along the center line of the array are four fluid coupling members 864 which engage conduits 863 on the second hydration carriers 860. The array is made of four separate lines or elements 190–193, each of which carries eight convex carriers 104. Each of the linear members 190–193 is mounted for reciprocation along internal guide rods 194 and 195 as more fully illustrated in FIG. 8. A pneumatic chuck 196, 197 is positioned on either side of the array, and upon actuation draws the outer most elements 190, 193 outwardly as illustrated in FIG. 8 along the guide rods 194, 195. Each of the outer most arrays 190, 193 also carries a pair of internal sliding stops, one of which is illustrated in FIG. 8 at 198 which draw the inner most linear elements 191 and 192 outwardly, with linear element 190 drawing linear 191, and linear element 193 drawing linear element 192. Compression springs 199 also assist in separating the linear elements of the array.

It should also be noted that the array 102 is rotatable about turntable 103 to provide for the proper orientation of the array when transferring lenses from the hydration station to the lens loading area. The robotic transfer device 100 also includes first and second articulated arms 107, 109 and a vertical arm 105 having a reciprocal servo motor 106 (see FIG. 2) mounted therein which enables complete three dimensional movement of the 4×8 array between each of the various transfer points which the robotic transfer device serves. As illustrated in FIG. 2, the weight of the 102 is substantially offset by a preload spring 108 which carries much of the weight of arm 105 and array 102, thereby reducing the load on vertical servo motor 106.

Each of the convex lens carrier elements 104 also includes an interior conduit 110 terminating in at least one port 111 which may be used to introduce a fluid between the convex lens carrier element and the contact lens 8. When the array 102 is positioned over the plurality of lens carrier elements at the lens loading area 18, the array elements 191–193 are spread to align each of the convex lens carrier elements 104 with an associated package carrier immediately therebelow, and a small amount, nominally 300 μl, of degassed and deionized water is pumped by precision dosing pumps 140 through conduit 110 to transfer the contact lens 8 from the convex carrier 104 to the bowl 36 of the package carrier 20. Again, the use of degassed deionized water enables transfer of the lens without risking the development of small air bubbles from dissolved gasses in the deionized water that might otherwise "seed" on the contact lens 8. After the lenses 8 have been transferred to the package carrier 20, the 4×8 array 102 is collapsed by actuating air chucks 196, 197, to return the array to a configuration that matches the configuration of the hydration carrier 860.

When both pair of inspection carriers 10 have been loaded at the lens loading area 18, a second servo motor actuated push arm 18(a) transfers both pallets from the lens loading area to a staging area 19(a) as illustrated in FIG. 1. At staging area 19(a), an overhead double axis transport carrier 21 singulates one of the inspection carriers and picks up a single pallet 10 for transfer to the automatic lens inspection station 15 as illustrated in FIGS. 1 and 3. The overhead transport 21 is a double axis Hauser Transport Mechanism, and is used to isolate the automatic lens inspection system 15 from the remainder of the post-hydration line. By utilizing a double axis transport mechanism, the pallet 10 can be gently conveyed to the automatic lens inspection system, and thereby avoid any vibration that might otherwise impair the inspection results. After the first pallet 10 has been lifted from the staging area 19(a), a push arm 19 moves the remaining pallet 10(b) into the staging area 19(a) for transfer by the double axis transport mechanism 21 to the Automatic Lens Inspection System 15, as illustrated in FIGS. 2 and 3.

In the Automatic Lens Inspection System illustrated in FIG. 3, as the inspection carriers are conveyed through the system by conveyors 15(b) a light beam or pulse is directed from sources 15(c) and through a lens to be directed and focused on a screen (not shown) to produce an image of the lens therebelow. Preferably, the screen includes an array of pixels, each of which generates a respective one electric signal proportional to, or representing, the intensity of the light incident on the pixel. Those electric signals are then processed to determine if the lens is acceptable for consumer use. Any suitable procedure may be used to process or analyze the electric signals from the pixel array; and, for instance, suitable procedures are disclosed in copending patent application Ser. Nos. 993,756 and 995,281, entitled "Automatic Lens Inspection System", the disclosures of which are herein incorporated by reference. As illustrated in FIGS. 3, separate systems are utilized to inspect the sixteen lenses carried in inspection carrier 10. After completing the test for the last bank of lenses, the Automatic Lens Inspection System sends a datablock with the vision inspection results to the programmable logic controller used to consolidate the lenses for packaging.

After the lenses have been inspected by the automatic lens inspection system 15, the inspection pallet is lifted by the second double axis overhead transport 22 and placed on conveyor 12(b) for transport to the deionized water removal station 24. The deionized water is removed by a specially configured nozzle, as described in U.S. Ser. No. 07/999,234, now U.S. Ser. No. 08/531,372 entitled "Solution Removal Nozzle", the disclosure of which is hereby incorporated herein by reference thereto. As described earlier, the deionized water is used to center the lens within the package carrier during the inspection process, but is removed prior to packaging, to enable a precise dosing of a buffered saline solution in the final package, as will hereinafter be described in detail.

After removal of the deionized water, the lenses, package carriers and inspection pallet are transported to the package removal pick point 25 which clamps the inspection pallet 10 to enable a second robotic transfer device 200 to remove the package carriers and lenses therefrom.

The Consolidation Buffer

As illustrated in FIGS. 2, 3 and 16, the second robotic transfer device 200 is positioned adjacent conveyors 12, 13 and has mounted thereon a 2×8 array 202 of sixteen independently actuable vacuum gripping means. Inspection pallet 10(b) is conveyed along conveyor 12 to a predetermined product pick point 25, as illustrated in FIG. 3 and the 2×8 array 202 is positioned thereabove to remove each of the sixteen products from the inspection carrier 10(b), immediately following the removal of the deionized water as previously described with respect to FIG. 3.

In the practice of the present invention, a programmable logic controller is used to control the various elements of the present invention and receives a vision datablock from the automated inspection system having a flag set for each of the products in inspection carrier 10(b) that is out of product specification.

After the products 20 have been removed from the inspection carrier 10(b), the robotic transfer device 200 positions the 2×8 array over conveyor belt 14 and selectively discharges the out of spec products. Those products are then removed by conveyor 14 for subsequent destruction or recycling.

The robotic device 200 then places the remaining products on a vacuum consolidation buffer 230 as indicated at 230(c). The vacuum consolidation buffer of the present invention will be described with respect to FIGS. 16–19 in which 230(a), (b) diagrammatically represent a pair of elongated vacuum rails defined by housing members 231(a), (b) which enclose vacuum plenums 242(a), (b) and which define a plurality of vacuum slits 244(a), (b).

The product array as deposited at 230(c) includes gaps or random variations in the product flow resulting from the removal of the defective products from the serial product flow. The vacuum consolidation buffer 230 includes a pair of pneumatic product followers 232, 234 which are used to consolidate the product group 230(c) with the other already consolidated products on consolidation rail 230.

Each of the pneumatic followers 232, 234 is independently advanced in the direction of arrow C until each product stream is consolidated, thereby eliminating gaps or voids in the product stream which result from the inspection and rejection of defective products. For example, as product 20(f) encounters product 20(g), the entire stream of product driven by product follower 232 will advance and trigger an optical sensor 236, which generates a control signal for the programmable logic controller to de-energize product follower 232 and return the follower to the initial start position. Likewise, optical sensor 238 generates a similar return signal for product follower 234 when the second product stream has been consolidated. After consolidation of the product, a separate indexing mechanism 240 returns both product streams in the direction of arrow D to a predetermined registration point for subsequent robotic handling. In the present invention, the consolidation buffer 230 includes a pair of vacuum rails 230(a), 230(b) which lightly grip the product to permit sliding movement of the product along the rails in response to product followers 232, 234, but which will prevent "shingling" or overlapping of adjacent edges of product packages which might otherwise occur during consolidation.

As illustrated in FIGS. 18 and 19, the product followers 232, 234 are mounted on pneumatically driven carriages, one of which is visible in elevation view of FIG. 18 and two of which are visible in plan view in FIG. 19. The carriage includes a rodless cylinder 250 mounted for reciprocation on pneumatic cylinder 252 and guided by guide rod 251. The product followers 232, 234 are each mounted to the respective carriages by virtue of a pair of parallel rods 254(a), (b), 254(c), (d) which are mounted for reciprocation within housings 250(a), (b).

The product string is advanced in the direction of arrow C until they trigger one or both of the optical sensors 236, 238. When the optical sensors are triggered, the programmable logic controller reverses the pneumatic bias on rodless cylinder 252 and the carriage 250 is then retracted to its original position as illustrated in FIG. 18. In addition, a proximity sensor (not shown) at the end of the stroke will also generate a signal to reverse the direction of carriage 250 if no product has been deposited on either of the consolidation buffer rail 230(a), (b).

After the respective product streams have been advanced from position 230(c) to actuate the optical sensor 238, a product indexing mechanism 240 is actuated to return the product string to a predetermined location for registration with the third robotic transfer device 300 which transfers product onto the packaging indexing table 400. The product indexing mechanism 240 includes a pneumatic cylinder 264 which actuates a push rod 266 and a pusher plate 262 into engagement with the product stream on the vacuum consolidation rails. The product pusher arm 262 then returns the leading edge of the first package carrier on each vacuum rail to a predetermined index position for registration with the 2×5 array 302 mounted on the packaging robotic transfer device 300.

Packaging Transfer

A package feed robotic handling device 300 is positioned between the consolidation buffer 230 and a packaging station 400, and is equipped with an array 302 which contains ten vacuum gripping means arranged in a 2×5 matrix. The 2×5 array 302 is first positioned over product group 20(d) and the vacuum gripping means is actuated to withdraw the first ten products from the vacuum consolidation buffer 230. The packaging robotic handling device 300 then positions the 2×5 array and product group 20(d) over position 1 on the packaging indexing table 400, and drops the array of products onto support pallet 410 mounted on the packaging indexing table 400.

During packaging, the package indexing turntable 400 rotates support pallets 410 from position to position to enable the products to undergo subsequent packaging steps. In the event there is a malfunction or delay in the operation of the package indexing turntable 400, the incoming product arriving on consolidation buffer 230 may be temporarily stored in a buffer area 308 which has a plurality of buffer pallets 310 positioned therein. When the packaging index table 400 resumes operation, the package robotic handling device 300 will then transfer products in the 2×5 arrays from the buffer pallets 310 to the support pallets 410 on a first-in, first-out basis.

If the product being handled is time sensitive, the programmable logic controller can generate a time stamp to be placed with each product array as it is transferred from any given processing station to any subsequent processing station. Thus, a time stamp may be placed on the product when inspected, or when transferred to the buffer area 308. If the product is transferred to buffer 308, the X, Y coordinates of the array are also stored with the time stamp. If the time sensitive allotment expires before packaging index table 400 has resumed operation, the packaging robotic handling device 300 will then discard expired time sensitive product, and will transfer only product meeting the time sensitive criteria to the support pallet 410. Likewise, if a problem in the production line results in an inordinate number of products being rejected, so that less than five products are available on either consolidation string 230(a), (b) at position 20(d) then the robotic handling device 200 will transfer product as necessary to balance product streams on both sides of the packaging consolidation buffer 230, and thereby enable removal of product as a 2×5 product array. Buffer area 308 will accommodate approximately fifty pallets for intermediate storage, or approximately 10 minutes of product stream in the event the packaging operation is temporarily interrupted for resupply, maintenance or adjustments.

Packaging

After the 2×5 array of package carriers has been deposited on support pallet 410, the pallet is rotated to position 412 where optical sensors verify that a package has been loaded at each position and that the packages are correctly aligned on the pallet. Indexing turntable 400 is then rotated again to station 414 wherein each of the individual package carriers are dosed with approximately 950 microliter of a saline solution.

Station 414 is illustrated in elevation view in FIG. 20, wherein five dosing nozzles 415 are positioned above five package carriers 20. Dosing nozzles 415 are mounted on a cantilever support arm 450 to thereby suspend the nozzle over the rotating table 400. A plurality of saline tubes 417 carry a buffered saline solution, from a plurality of precision dosing pumps, similar to the F.M.I. pumps used to pump the deionized water to dosing station 16 depicted in FIGS. 1 and 3.

The use of deionized water in the hydration and inspection steps significantly speeds the production line as a whole since the time consuming ionic neutralization of the polymer from which the lenses are made does not occur until after the inspection process. When deionized water is used for hydration and inspection, the final step of the process is to introduce buffered saline solution into the final package with the lens and then seal the lens within the package so that final lens equilibration (ionic neutralization, final hydration and final lens dimensioning) is accomplished in the package at room temperature or during sterilization after the lens has been packaged and sealed.

Figure 5:
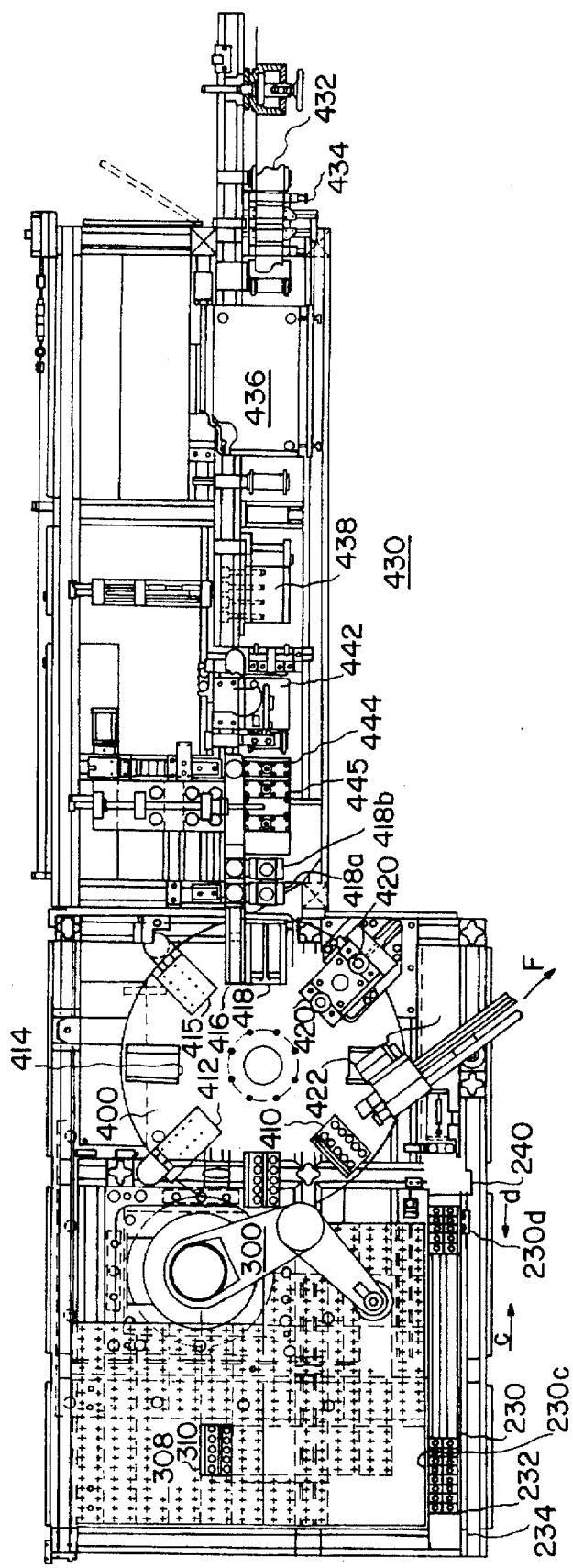
FIG. 5 is a plan view of the apparatus illustrated in FIG. 4 illustrating both a consolidation buffer and a packaging buffer arranged immediately prior to the packaging apparatus.

It has been determined empirically that it is desirable that soft contact lenses produced in accordance with the present invention be exposed to atmosphere for no more than sixty minutes between the removal of the deionized water at station 24 (illustrated in FIG. 3) and the dosing of the saline solution at station 414 in FIG. 5. The programmable logic controller which previously received the inspection results from the automated lens inspection system and correlated those results to the individual lenses, also time stamps the individual lenses at the pick up point 25, immediately following the removal of the deionized water at station 24. This time stamp is transferred through Consolidation and into the 2×5 array when removed by the packaging robotic transfer device 300. In the event the indexing turntable 400 is not operational, and the 2×5 array is stored in the buffer 308, then the X, Y coordinates of the 2×5 array are stored with the time stamp to enable the packaging robotic transfer device 300 to select "fresh" product, e.g. less than sixty minutes old, at the time the packaging dial 400 resumes operation. After operation is resumed, the robotic transfer device 300 will then dispose of the "expired" product, rather than transferring it to the packaging dial.

After saline dosing at station 414, the saline level is checked at station 415 and the support pallet is then rotated under a final product check station 416 to a foil receiving station 418.

As described earlier, each group of 5 package carriers 20 receives a single laminated foil cover sheet which is heat sealed to the package carriers. The lens package is more fully described in U.S. Ser. No. 995,607, entitled "Packaging Arrangement for Contact Lenses", also assigned to the assignee of the present invention, the disclosure of which is incorporated herein by reference thereto.

Figure 4:
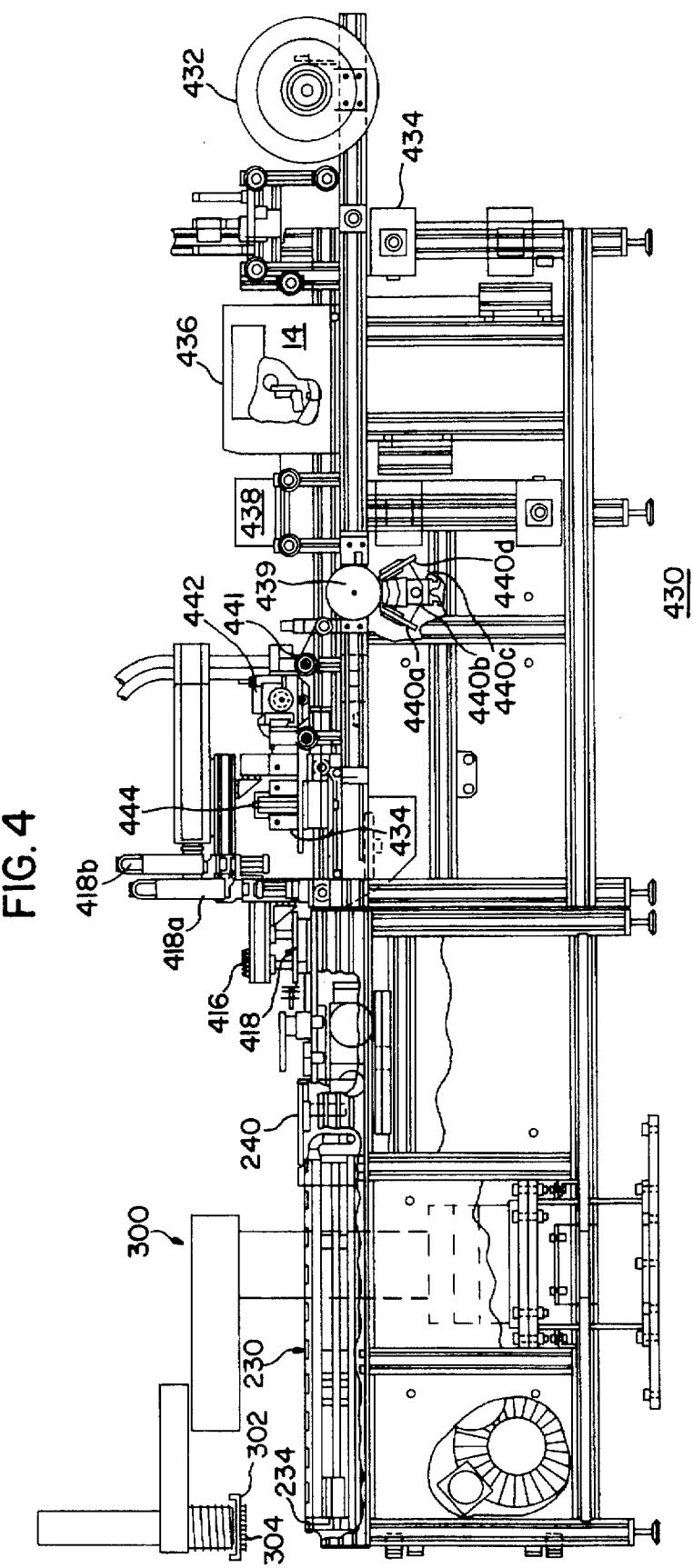
FIG. 4 is an elevation view of a consolidation buffer used in the present invention, and the packaging apparatus to which the consolidated product flow is transferred.

The laminated foil stock 432 is fed from a large indefinite spool through a tensioning device 434 to an ink jet printer 436 which prints the lot, batch and power number of the lenses to be packaged. The foil laminate is cut from an indefinite length product into two strips that are heat sealed to the 2×5 product array to provide two separate 1×5 product strips. The foil in between each of the package carriers is also partially severed, scored or perforated to enable the consumer to separate individual packages from the 1×5 array at the time the product is used. The partial scoring is done with a series of rolling blades 440(a)–(d) which are pneumatically biased into a drum 439. The foil is then split into two strips by a foil slitter blade 441 and the foil passes through a stationary gripper and sensing mechanism 442. A video camera 438 and a series of sensors at station 442 are used to provide precise alignment of the information printed by the ink jet printer 436, with the printing fields into which said printing is placed, and the alignment of the perforations or scores provided by rolling blades 439. An advancing gripper 434 is provided to draw a length of foil laminate corresponding to the 1×5 array and sever the strips with a rotating knife 444. At the completion of this cut, the advancing gripper 434 has advanced in the direction of arrow E in FIG. 4 to place the 1×5 foil strips under vacuum gripping heads 418(a), (b). These vacuum gripping heads then reciprocate downwardly to grip the foil, lift it from the advancing and cutting station 434, and transfer the foil to the package indexing turntable 400 at the foil placement station 418.

The package indexing turntable 400 is then rotated again, and a heat seal mechanism 420 seals a single strip of foil to five separate package carriers in a single high temperature short cycle sealing operation.

Figure 21:
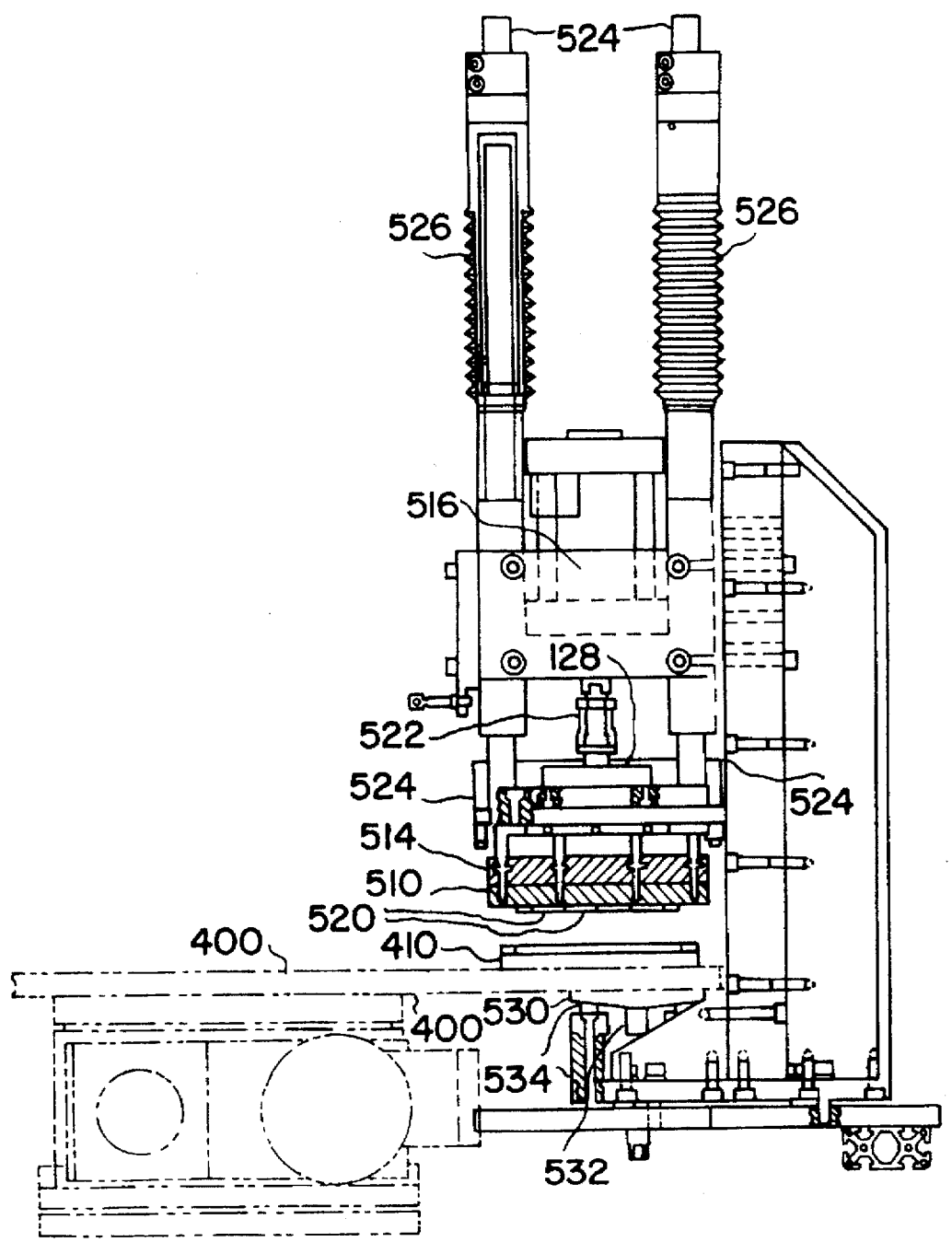
FIG. 21 is a partially cross-section and diagrammatic elevation front view of a heat sealing head and pneumatic press used to hermetically seal the package carrier of the present invention.

As illustrated in FIGS. 21 and 22, the foil strips are heat sealed to the two 1×5 arrays of package carriers 20. A heated seal head 510, heated by a plurality of electric heaters 512 (two of which are illustrated in the embodiment of FIG. 22) mounted in a heating plate 514. The heating plate 514 is secured to the back of the seal head 510, and is supported by a pneumatic cylinder or press 516 which presses the heated seal head 510 against the laminar foil sheet on the package carriers 20, which are supported by the pallet 410 such that the foil laminate and package carrier flanges are squeezed between the heated seal head and the pallet 410 as supported by the index turntable. The heated seal head is electrically heated, and the temperature thereof is measured by thermocouples 518 on each side of the seal head 510 to maintain the temperature at a high temperature, when compared to similar prior art arrangements. The temperature is maintained in a range from 210°–265° C., preferably at 258° C.

The heated seal head comprises a 2×5 array of cylindrical sealing elements 520, each of which secures one of the foil laminar sheets to each group of package carriers 20 with an annular seal 39 around the cavity 36 in the package carrier 20. The pneumatic cylinder is coupled to the heated seal head by a mount jack bolt 522 and cylindrical support struts 524. The support struts 524 are biased upwardly by springs 526, such that the heated seal head is raised and normally biased to the upper position illustrated in FIG. 21, unless the pneumatic cylinder 516 forces it down for a sealing operation.

In operation, the back force generated by the pneumatic cylinder is measured by an in-line load cell 528, and a solid state timer is initiated when a force is reached of approximately 2700 newtons, which is approximately 75% of the peak force of approximately 3600 newtons. The solid state timer times a relatively short time period of approximately 0.4 to 0.48 seconds, after which the pressure in the pneumatic cylinder 516 is released. This approach, when compared with similar prior art approaches, is very hot, very hard and very short, which creates a seal which is both detachable and customer friendly.

The package indexing turntable 400 is preferably reinforced under the seventh angular position to withstand the heat sealing forces imparted thereto by the pneumatic cylinder 516. The indexing turntable 400 must be maintained in a substantially level position for the operations described herein. The pneumatic cylinder 516 at the seventh position applies a substantial force to the indexing turntable, and accordingly to maintain the turntable level, an approximately 2½×3½ inch support block 530 of a durable plastic material, similar to Teflon®, is placed on top a central support 532 and surrounding supports 534 positioned beneath the pneumatic press. The support block 530 is in constant contact with the indexing turntable 400 to ensure that the deflection of the indexing turntable 400 under the pneumatic cylinder 516 is minimal. Alternatively, a pneumatically actuable movable support could be positioned in contact with the bottom of the indexing turntable prier to operation of the pneumatic cylinder driving the heated seal head, and be repositioned out of contact with the bottom of the table after operation of the pneumatic cylinder.

The package indexing turntable 400 is then rotated to position 422 where a reciprocating transfer head 446 removes the sealed product from the indexing turntable 400 and transports it in the direction of arrow F for sterilization and cartoning.

While the invention has been particularly shown and described with respect to the preferred embodiments thereof, it will be understood by those skilled in the art that the foregoing, and other changes in form and details, may be made therein without departing from the spirit and scope of the invention, which is limited only by the scope of the following claims.

We claim:

1. An automated apparatus for automatically inspecting and packaging contact lenses in a contact lens fabrication facility, said apparatus comprising:
   (a) an inspection pallet for transporting a plurality of contact lens packages, each of said packages adapted to receive a contact lens for inspection thereof;
   (b) an automatic lens inspection station for optically inspecting a plurality of contact lenses carried in said packages transported by said inspection pallet and generating a first signal for each defective lens;
   (c) an articulated robotic transfer device for periodically transferring a first predetermined number of individual packages from said inspection pallet to an intermediate consolidation buffer and depositing said packages on said consolidation buffer;
   (d) a controller for tracking and identifying each individual contact lens inspected and conveyed from said inspection station to said consolidation buffer, said control means including means for storing said first signals identifying individual contact lenses determined to be defective and generating a second signal to cause said articulated robotic transfer device to discard any individual contact lens identified by said inspection station as being defective prior to the deposit of said package on said consolidation buffer; and
   (e) second robotic transfer device for transferring a second predetermined amount of individual packages from said consolidation buffer to a packaging station during a period of operation.

2. An automated apparatus for automatically inspecting and packaging contact lenses in a contact lens fabrication facility, as claimed in claim 1, wherein said consolidation buffer consolidates random variations in a flow of individual packages to provide said second predetermined amount for said second robotic transfer device.

3. An automated apparatus for automatically inspecting and packaging contact lenses in a contact lens fabrication facility, as claimed in claim 1, wherein said control means further includes means for determining whether said packaging station is available to receive said second predetermined amount of packages at said period of operation, said control means further directing said second robotic means to transfer said second predetermined amount of packages to an intermediate storage means when it is determined that said packaging station is not available to receive said second predetermined amount of packages during said period.

4. An automated apparatus for automatically inspecting and packaging contact lenses in a contact lens fabrication facility, as claimed in claim 3, wherein said control means directs said second robotic transfer device to retrieve said second predetermined amount of packages from said intermediate storage means and transfer said packages to said packaging station when said packaging station is available to receive said package carriers.

5. An automated apparatus for automatically inspecting and packaging contact lenses in a contact lens fabrication facility, as claimed in claim 4, wherein said control means further includes timing means for generating first time stamp data for each identified package in said first predetermined amount of packages prior to transferring said first predetermined amount from said inspection station.

6. An automated apparatus for automatically inspecting and packaging contact lenses in a contact lens fabrication facility, as claimed in claim 1, wherein said predetermined amount of packages includes an X, Y array of packages, and said consolidation buffer includes at least X number of individual buffers.

7. An automated apparatus for automatically inspecting and packaging contact lenses in a contact lens fabrication facility, as claimed in claim 6, wherein said control means stores a status for each of said X number of individual buffers, including a count for each addition of packages, and a count for each second predetermined amount transferred to said packaging station.

8. An automated apparatus for automatically inspecting and packaging contact lenses in a contact lens fabrication facility, as claimed in claim 7, wherein said articulated robotic transfer device includes an array of independently actuable vacuum gripping means for gripping said packages.

9. An automated apparatus for automatically inspecting and packaging contact lenses in a contact lens fabrication facility, as claimed in claim 8, wherein said articulated robotic transfer device will transfer packages between individual buffers to complete said X, Y array of packages for said second robotic transfer device.

10. An automated apparatus for automatically inspecting and packaging contact lenses in a contact lens fabrication facility, as claimed in claim 1, wherein said apparatus further includes a deionized water injection station for injecting a predetermined amount of deionized water into each of said packages.

11. An automated apparatus for automatically inspecting and packaging contact lenses in a contact lens fabrication facility, as claimed in claim 10 wherein said deionized water injection station injects said deionized water into each of said packages before said package receives said contact lens.

12. An automated apparatus for automatically inspecting and packaging contact lenses in a contact lens fabrication facility, as claimed in claim 10 wherein said apparatus further includes a station for removing said deionized water after said contact lenses have been inspected at said inspection station.

13. An automated apparatus for automatically inspecting and packaging contact lenses in a contact lens fabrication facility, as claimed in claim 10, wherein said apparatus further includes a degas apparatus to degas the deionized water before the injection of said deionized water into said packages.

14. An automated apparatus for automatically inspecting and packaging contact lenses in a contact lens fabrication facility, as claimed in claim 11 wherein said apparatus further includes a robotic array for transferring an array of individual contact lenses from a hydration station to a load station having an array of said packages in said inspection carrier positioned to receive said contact lenses.

15. An automated apparatus for automatically inspecting and packaging contact lenses in a contact lens fabrication facility, as claimed in claim 14, wherein said robotic array comprises:

(a) a robotic transfer head, said head facilitating transfer of said lens from said hydration station to said load station, said transfer head also having;
  (i) a plurality of contact lens carriers, each of said carriers defining a convex lens attachment surface to receive a contact lens and a second fluid means for introducing a fluid between said contact lens attachment surface and said convex surface, said lens being retained thereon during transfer by surface tension;
  (ii) a robotic transport for moving said transfer head from said hydration station to said load station;
(b) fluid supply means for supplying at least one fluid to each of said contact lens carriers;

wherein said contact lenses are transferred to said apparatus by said robotic transfer head, and deposited into said packages by an injection of a fluid which breaks the surface tension between said contact lens attachment surface and the contact lenses carried thereon.

16. An automated apparatus for automatically inspecting and packaging contact lenses in a contact lens fabrication facility, as claimed in claim 11, wherein said apparatus further comprises:

(a) a robotic transfer head, said head facilitating transfer of said contact lenses from a hydration station to an array of said packages carried by said inspection pallet at a load station, said transfer head also having;
  (i) a plurality of contact lens carriers, each of said carriers defining a convex lens attachment surface to receive a contact lens and at least one fluid port defined therein for introducing a fluid between said contact lens and said convex surface;
  (ii) an articulated transport for moving said transfer head from said first processing station to said second processing station;
(b) a blow-off station, said station having a plurality of concave surfaces with at least one port in each surface for introducing a fluid jet therethrough, said plurality aligned to cooperate with said plurality of convex lens attachment surfaces to direct said fluid jets against said contact lenses being transported by said transfer head;
(c) said controller also actuating said articulated transport and said fluid jets to align said convex carriers with said concave surfaces and to dissipate any air bubbles on said contact lens with said fluid jets.

17. An automated apparatus for automatically inspecting and packaging contact lenses in a contact lens fabrication facility, as claimed in claim 11, wherein said apparatus further includes a defective lens conveyor positioned between said inspection station and said consolidation buffer to receive defective lenses discarded by said articulated robotic transfer device.

18. An automated apparatus for automatically inspecting and packaging contact lenses in a contact lens fabrication facility, as claimed in claim 17, wherein said articulated robotic transfer device includes an array of independently actuable vacuum gripping means for gripping said packages, wherein said articulated robotic transfer device can discard said defective lenses by pausing over said conveyor and individually releasing the vacuum gripper for any defective lens over the defective lens conveyor.

* * * * *

UNITED STATES PATENT AND TRADEMARK OFFICE
CERTIFICATE OF CORRECTION

PATENT NO. : 5,687,541
DATED : November 18, 1997
INVENTOR(S) : Martin, et al.

It is certified that error appears in the above-indentified patent and that said Letters Patent is hereby corrected as shown below:

```
Column 19  -  Line 57  -  change "11" to "1"

Column 20  -  Line 23  -  change "11" to "1"

Column 20  -  Line 50  -  change "11" to "1"
```

Signed and Sealed this

Fourteenth Day of April, 1998

Attest:

BRUCE LEHMAN

*Attesting Officer*    *Commissioner of Patents and Trademarks*